(12) United States Patent
Liu

(10) Patent No.: US 10,390,246 B2
(45) Date of Patent: Aug. 20, 2019

(54) CHANNEL MEASUREMENT METHOD, TERMINAL DEVICE, AND BASE STATION

(71) Applicant: Huawei Technologies Co., Ltd., Shenzhen, Guangdong (CN)

(72) Inventor: Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/061,386

(22) Filed: Mar. 4, 2016

(65) Prior Publication Data

US 2016/0192229 A1 Jun. 30, 2016

Related U.S. Application Data

(63) Continuation of application No. PCT/CN2013/082920, filed on Sep. 4, 2013.

(51) Int. Cl.
*H04B 1/38* (2015.01)
*H04W 24/10* (2009.01)
(Continued)

(52) U.S. Cl.
CPC ............ *H04W 24/10* (2013.01); *H04B 7/065* (2013.01); *H04B 7/0626* (2013.01); *H04L 1/0026* (2013.01); *H04L 1/0031* (2013.01)

(58) Field of Classification Search
CPC ..... H04W 48/16; H04W 48/18; H04W 72/04; H04W 80/04; H04M 1/72511; H04L 2012/5607

(Continued)

(56) References Cited

U.S. PATENT DOCUMENTS

| | | | |
|---|---|---|---|
| 7,978,623 B1 * | 7/2011 | Kotecha | H04B 7/063 370/252 |
| 8,423,008 B2 * | 4/2013 | Pedersen | H04W 24/10 370/310.2 |

(Continued)

FOREIGN PATENT DOCUMENTS

| | | |
|---|---|---|
| CN | 101394251 A | 3/2009 |
| CN | 102387528 A | 3/2012 |

(Continued)

OTHER PUBLICATIONS

3GPP TSG-RAN WG2 #78, May 21-25, 2012 (Note: provided by applicant is copending U.S. Appl. No. 14/866,104).*

(Continued)

*Primary Examiner* — Stephen M D Agosta

(57) ABSTRACT

The present invention discloses a channel measurement method, including: acquiring first channel information, where the first channel information includes one or more of the following information: first CSI of a first channel, and first measurement configuration information used for measuring the first channel; receiving second measurement configuration information sent by a base station and used for measuring a second channel, and measuring the second channel according to the first channel information and the second measurement configuration information, to obtain second CSI. The present invention further discloses a terminal device and a base station. Subsets of a CSI-RS pattern of a whole antenna and a CSI-RS pattern of a partial antenna are configured and feedbacks to quality information of a whole channel and quality information of a partial channel are combined, so that not only signaling is reduced but also feedback accuracy is improved.

15 Claims, 21 Drawing Sheets

(51) Int. Cl.
*H04L 1/00* (2006.01)
*H04B 7/06* (2006.01)

(58) Field of Classification Search
USPC .................. 455/434, 435, 2, 450, 455, 464; 370/310.2, 328
See application file for complete search history.

(56) References Cited

U.S. PATENT DOCUMENTS

| | | | |
|---|---|---|---|
| 9,426,703 B2* | 8/2016 | Geirhofer | H04L 5/0032 |
| 9,787,383 B2* | 10/2017 | Seo | H04B 7/0626 |
| 2008/0219370 A1* | 9/2008 | Onggosanusi | H04B 7/0417 375/260 |
| 2010/0074316 A1* | 3/2010 | Kim | H04L 1/0026 375/228 |
| 2010/0197314 A1* | 8/2010 | Maaref | H04W 16/04 455/450 |
| 2011/0129033 A1 | 6/2011 | Dai et al. | |
| 2011/0194596 A1* | 8/2011 | Svedman | H04L 1/002 375/224 |
| 2011/0268204 A1* | 11/2011 | Choi | H04B 7/0639 375/260 |
| 2011/0273993 A1* | 11/2011 | Mazzarese | H04L 1/0026 370/241 |
| 2012/0063500 A1* | 3/2012 | Wang | H04L 1/0026 375/224 |
| 2012/0076025 A1* | 3/2012 | Barbieri | H04L 5/0023 370/252 |
| 2012/0120846 A1* | 5/2012 | Hwang | H04W 24/10 370/254 |
| 2012/0127911 A1 | 5/2012 | Nishikawa et al. | |
| 2012/0218948 A1* | 8/2012 | Onggosanusi | H04L 1/0031 370/329 |
| 2012/0281578 A1 | 11/2012 | Hong et al. | |
| 2013/0003788 A1* | 1/2013 | Marinier | H04B 7/024 375/219 |
| 2013/0051240 A1* | 2/2013 | Bhattad | H04L 5/005 370/241 |
| 2013/0058295 A1* | 3/2013 | Ko | H04B 7/063 370/329 |
| 2013/0114656 A1* | 5/2013 | Sayana | H04B 7/024 375/219 |
| 2013/0114658 A1* | 5/2013 | Davydov | H04W 4/06 375/224 |
| 2013/0148515 A1* | 6/2013 | Ribeiro | H04L 5/0094 370/252 |
| 2013/0201841 A1* | 8/2013 | Zhang | H04L 1/1607 370/252 |
| 2013/0322361 A1* | 12/2013 | Ko | H04B 7/0632 370/329 |
| 2013/0329664 A1* | 12/2013 | Kim | H04W 24/10 370/329 |
| 2014/0192762 A1 | 7/2014 | Li et al. | |
| 2014/0226612 A1 | 8/2014 | Kim et al. | |
| 2016/0192229 A1 | 6/2016 | Liu | |

FOREIGN PATENT DOCUMENTS

| | | |
|---|---|---|
| CN | 103220068 A | 7/2013 |
| CN | 103220069 A | 7/2013 |
| EP | 1 873 956 A2 | 1/2008 |
| JP | 2014531144 | 11/2014 |
| JP | 2015510322 A | 4/2015 |
| JP | 2016534651 A | 11/2016 |
| WO | 2011074816 A2 | 6/2011 |
| WO | WO 2011/115421 A2 | 9/2011 |
| WO | 2013051909 A2 | 4/2013 |
| WO | WO 2013/051886 A2 | 4/2013 |
| WO | 2013109041 A1 | 7/2013 |

OTHER PUBLICATIONS

Alcatel-Lucent Shanghai Bell, Alcatel-Lucent, Considerations on CSI feedback enhancements for high-priority antenna configurations, 3GPP TSG-RAN WG1#66 R1-112420.

* cited by examiner

CHANNEL MEASUREMENT METHOD, TERMINAL DEVICE, AND BASE STATION

CROSS-REFERENCE TO RELATED APPLICATIONS

This application is a continuation of International Application No. PCT/CN2013/082920, filed on Sep. 4, 2013, which is hereby incorporated by reference in its entirety.

TECHNICAL FIELD

Embodiments of the present invention relate to the field of mobile communications technologies, and in particular, to a channel measurement method, a terminal device, and a base station.

BACKGROUND

In the field of mobile communications technologies, a beam at a transmit end of a base station is often adjusted in a horizontal dimension, and a downtilt angle is fixed for each terminal in a vertical dimension. Therefore, various beamforming and precoding technologies are all based on channel information in the horizontal dimension. Because a channel is three-dimensional (3D), an optimal throughput of a system cannot often be achieved by means of a method of a fixed downtilt angle. Therefore, beam adjustment in the vertical dimension is very important to improvement of system performance. A technical concept thereof mainly is: a 3D beamforming weighted value at an active antenna end is adjusted according to 3D channel information estimated by a terminal, so that a main lobe of a beam is "aligned to" a target terminal in 3D space, so as to greatly improve received signal power, and improve a signal to interference plus noise ratio, thereby improving a throughput of an entire system.

A 3D beamforming technology is based on an active antenna system (AAS) currently, and compared with a conventional antenna (for example, a 2D antenna array), an active antenna further provides a degree of freedom in a vertical direction. Therefore, a system capacity can be improved.

Currently, a measurement mechanism for channel state information (CSI) is mainly specific to a conventional antenna, and when the measurement mechanism is applied to an AAS antenna, measurement accuracy can hardly be met.

SUMMARY

In view of this, embodiments of the present invention provide a channel measurement method, so as to measure channel state information based on an active antenna system.

According to a first aspect, the present invention provides a channel measurement method, including:

acquiring, by a terminal, first channel information, where the first channel information includes one or more of the following information: first channel state information (CSI) of a first channel, and first measurement configuration information used for measuring the first channel;

receiving, by the terminal, second measurement configuration information sent by a base station and used for measuring a second channel; and measuring, by the terminal, the second channel according to the first channel information and the second measurement configuration information, to obtain second CSI.

According to a second aspect, the present invention provides a channel measurement method, including:

acquiring, by a base station, second CSI, where the second CSI is associated with first channel information, and the first channel information includes one or more of the following information: reported first channel state information (CSI) of a first channel, first channel state information (CSI) of the first channel that is configured by the base station, and first measurement configuration information used for measuring the first channel.

According to a third aspect, the present invention provides a terminal device, including:

a channel information acquiring unit, configured to acquire first channel information, where the first channel information includes one or more of the following information: first channel state information (CSI) of a first channel, and first measurement configuration information used for measuring the first channel;

a configuration information receiving unit, configured to receive second measurement configuration information sent by a base station and used for measuring a second channel; and a channel measurement unit, configured to measure the second channel according to the first channel information and the second measurement configuration information, to obtain second CSI.

According to a fourth aspect, the present invention provides a base station, including: a second CSI acquiring unit, configured to acquire second CSI, where the second CSI is associated with first channel information, and the first channel information includes one or more of the following information: reported first channel state information (CSI) of a first channel, first channel state information (CSI) of the first channel that is configured by the base station, and first measurement configuration information used for measuring the first channel.

By means of the foregoing solutions, subsets of a CSI-RS pattern of a whole antenna and a CSI pattern of a partial antenna can be configured and feedbacks to quality information of a whole channel and quality information of a partial channel can be combined, so that not only signaling is reduced, but also feedback accuracy can be improved.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION

In the prior art, channel measurement and reporting mechanisms for a 2D antenna array and an ASS antenna are: performing measurement and reporting separately in a horizontal dimension and a vertical dimension, and then, CSI of an antenna array is obtained through combination on a base station side, and the CSI may also be referred to as channel quality information. However, measurement in the horizontal dimension and the vertical dimension can only reflect information of the partial antenna array; therefore, the obtained CSI is not the most comprehensive, and there is a loss; as a result, accuracy is reduced.

In the following embodiments, channel measurement in a dimension or some dimensions (for example, a vertical dimension and a horizontal dimension) is associated with channel measurement that can reflect a whole antenna, to reduce a loss, thereby improving measurement accuracy.

Figure 1:
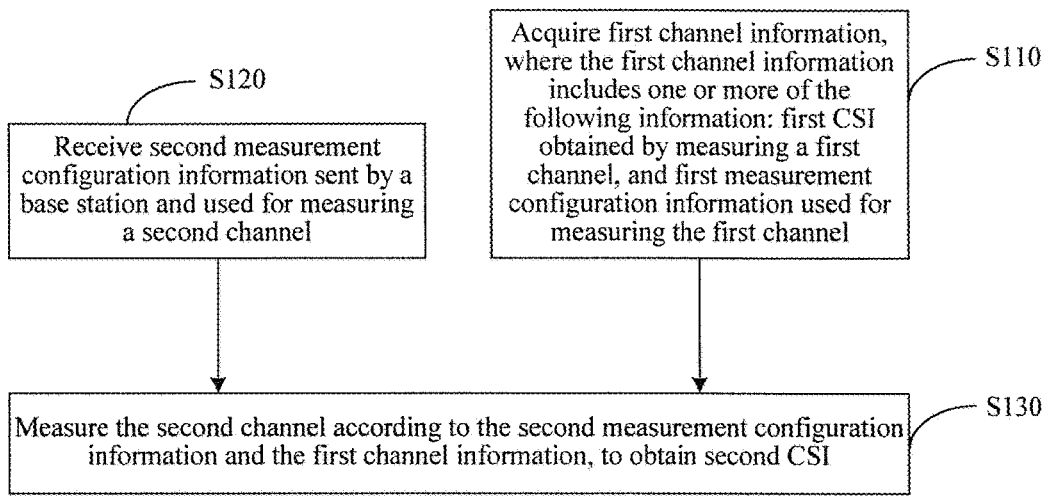
FIG. 1 is a flowchart of a channel measurement method according to an embodiment of the present invention.

Refer to FIG. 1, which is a flowchart of a channel measurement method according to an embodiment of the present invention. A base station configures a second CSI process for a which corresponds to measurement on the following second channel, so that the terminal measures the second channel. As shown in FIG. 1, the method is performed by a terminal, and includes the following steps:

S110: Acquire first channel information, where the first channel information includes one or more of the following information: first CSI obtained by measuring a first channel, and first measurement configuration information used for measuring the first channel.

S120: Receive second measurement configuration information sent by a base station and used for measuring a second channel.

S130: Measure the second channel according to the second measurement configuration information and the first channel information, to obtain second CSI.

It should be noted that, an order of step S110 and step S120 is not required, and the first CSI is information configured by the base station, or is information that is measured and reported to the base station by the terminal according to the first measurement configuration information.

Step S130 specifically includes:

determining, according to the first channel information, a CSI range for measuring the second channel, which is specifically determining, according to the first CSI in the first channel information, a range of the second CSI that is obtained by measuring the second channel. The first CSI is information configured by the base station, or is information that is measured and reported by the terminal according to the first measurement configuration information.

Measurement on the first channel corresponds to a whole antenna, and is used for obtaining CSI that reflects a channel state of the whole antenna, and measurement on the second channel corresponds to a partial antenna, for example, an antenna in a dimension (a vertical dimension, a horizontal dimension, or the like), and is used for obtaining CSI that reflects a channel state of the partial antenna.

In this embodiment, when performing channel measurement that reflects the partial antenna (measuring the second channel), the terminal associates the channel measurement that reflects the partial antenna with channel measurement that reflects the whole antenna, so as to reduce a loss and improve measurement accuracy.

The foregoing and the following CSI may include one or more of the following information: a rank indication (RI), a precoding matrix indicator (PMI), a precoding type indicator (PTI), a channel quality indicator (CQI), an interference indication, and a restrictive measurement flag for restricting a CSI measurement range.

Each piece of measurement configuration information includes one or more of the following information: a pattern of a channel measurement reference pilot, a port quantity of the channel measurement reference pilot, power information of the channel measurement reference pilot, a pattern of an interference measurement reference resource, and information about the interference measurement reference resource.

Figure 2:
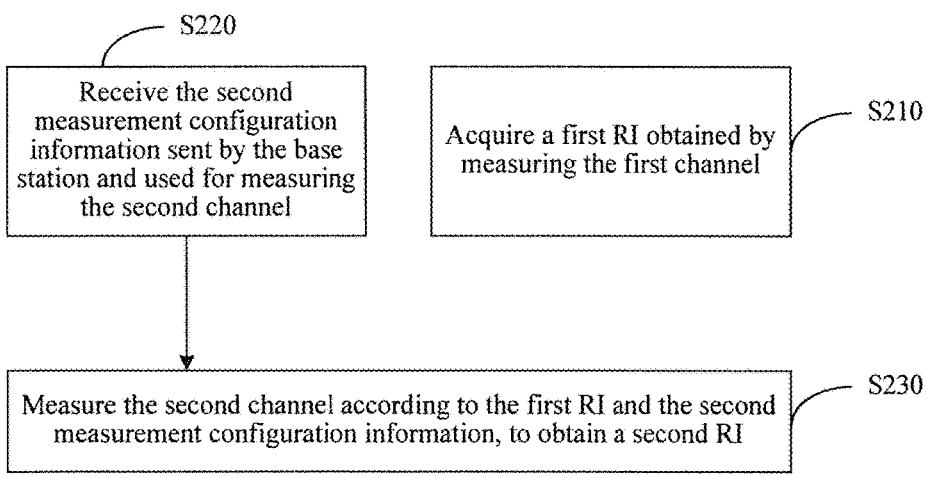
FIG. 2 is a flowchart of another channel measurement method according to an embodiment of the present invention.

An example in which CSI includes an RI is used below with reference to FIG. 2 to describe in detail the method shown in FIG. 1. As shown in FIG. 2, the method is performed by the terminal, and includes the following steps:

S210: Acquire a first RI obtained by measuring the first channel.

S220: Receive the second measurement configuration information sent by the base station and used for measuring the second channel.

S230: Measure the second channel according to the first RI and the second measurement configuration information, to obtain a second RI.

Figure 3:
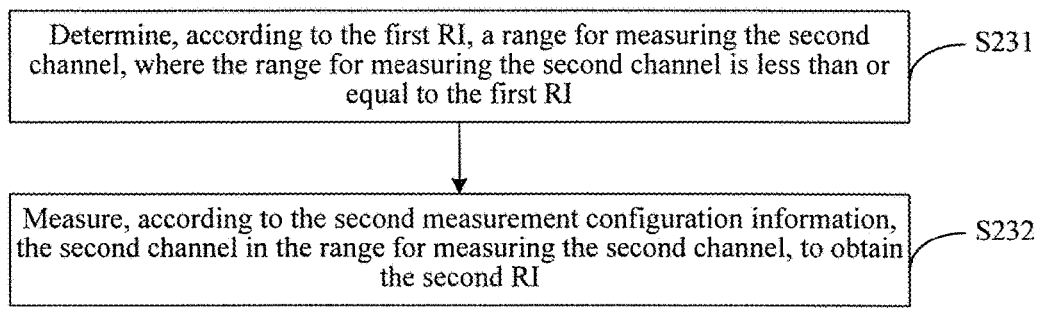
FIG. 3 is a specific flowchart of step S230 in FIG. 2.

Further, referring to FIG. 3, step S230 may include:

S231: Determine, according to the first channel information, a range for measuring the second channel, where the range for measuring the second channel is less than or equal to the first RI, which is specifically determining a range of the second RI according to the first RI.

S232: Measure, according to the second measurement configuration information, the second channel in the range for measuring the second channel, to obtain the second RI.

That is, there is a function relationship between the first RI and the second RI. Assume that the first RI is RI(1), and the second RI is RI(2), so that the function relationship is RI(2)≤RI(1).

Figure 4:
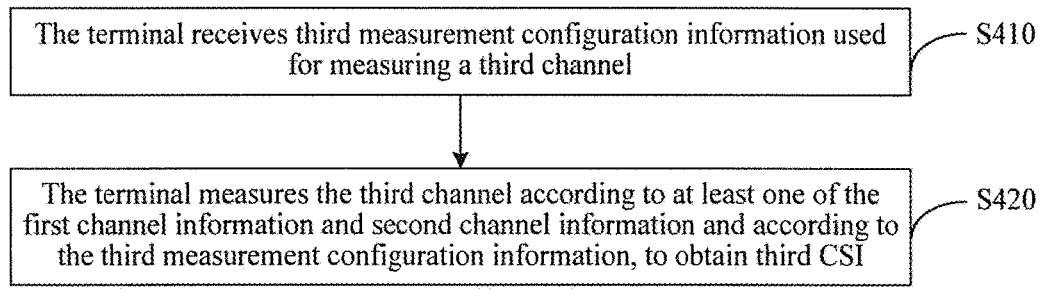
FIG. 4 is a flowchart of another channel measurement method according to an embodiment of the present invention.

Referring to FIG. 4, the base station configures two CSI processes (a second CSI process and a third CSI process) for the terminal, which respectively correspond to measurement on the second channel and measurement on a third channel below, and respectively correspond to antennas in two dimensions such as the horizontal dimension and the vertical dimension. If measurement on the second channel corresponds to an antenna in the horizontal dimension, measurement on the third channel corresponds to an antenna in the vertical dimension, or if measurement on the third channel corresponds to the antenna in the horizontal dimension, measurement on the second channel corresponds to the antenna in the vertical dimension. As shown in FIG. 4, the method is performed by the terminal, and further includes the following steps in addition to including step S110 to step S130 shown in FIG. 1:

S410: The terminal receives third measurement configuration information used for measuring the third channel.

S420: The terminal measures the third channel according to at least one of the first channel information and second channel information and according to the third measurement configuration information, to obtain third CSI. The second channel information includes the second CSI obtained by measuring the second channel, or configured CSI that is configured by the base station, which is specifically configured through an upper layer or configured dynamically.

Step S420 specifically includes:

determining, according to at least one of the first channel information and the second channel information, a CSI range for measuring the third channel. Specifically, the CSI range for measuring the third channel is determined according to at least one of the first CSI and the second CSI; or the CSI range for measuring the third channel is determined according to at least one of the first CSI and the configured CSI in the second channel information.

The third channel is measured, according to the third measurement configuration information, in the CSI range for measuring the third channel.

Using an example in which CSI includes an RI, step S420 in FIG. 4 further includes the following steps:

S421: Determine a range of a third RI in the third CSI according to at least one of the first RI in the first CSI and the second RI in the second CSI; or S422: Determine a range of a third RI in the third CSI according to at least one of the first RI in the first CSI and a configured RI in the configured CSI. A manner of determining the range of the third RI is fixed, or is notified by using upper layer signaling or dynamic signaling of the base station.

Assume that the third RI is RI(3), the first RI is RI(1), and the second RI is RI(2), and there is a function relationship between RI(3) and RI(1) and/or RI(2). In this case, the range for measuring the third channel may include the following several cases:

RI(3)≤RI(1), or RI(3)<RI(1); or a value obtained by rounding a quotient of RI(1) and RI(2)≤RI(3)≤RI(1), or a value obtained by rounding a quotient of RI(1) and RI(2)<RI(3)≤RI(1), or a value obtained by rounding a quotient of RI(1) and RI(2)≤RI(3)<RI(1), or a value obtained by rounding a quotient of RI(1) and RI(2)<RI(3)<RI(1), where the rounding is rounding up or rounding down; or a value obtained by rounding a quotient of RI(1) and a configured RI in the second channel information≤RI(3)≤RI(1), or a value obtained by rounding a quotient of RI(1) and a configured RI in the second channel information<RI(3)≤RI(1), or a value obtained by rounding a quotient of RI(1) and a configured RI in the second channel information≤RI(3)<RI(1), or a value obtained by rounding a quotient of RI(1) and a configured RI in the second channel information<RI(3)<RI(1), where the rounding is rounding up or rounding down; or RI(3)≤a value obtained by rounding a quotient of RI(1) and RI(2), or RI(3)<a value obtained by rounding a quotient of RI(1) and RI(2), where the rounding is rounding up or rounding down; or RI(3)≤a value obtained by rounding a quotient of RI(1) and a configured RI in the second channel information, or RI(3)<a value obtained by rounding a quotient of RI(1) and a configured RI in the second channel information, where the rounding is rounding up or rounding down; or RI(3)=a value obtained by rounding a quotient of RI(1) and RI(2), where the rounding is rounding up or rounding down; or RI(3)=a value obtained by rounding a quotient of RI(1) and a configured RI in the second channel information, where the rounding may be rounding up or rounding down.

In addition, the third CSI may further include a PMI in the third CSI and a CQI in the third CSI; therefore, step S420, that is, the terminal measures the third channel, may further include:

determining the PMI in the third CSI, where the PMI in the third CSI includes a third PMI or a fourth PMI, and the determining the PMI in the third CSI may specifically include:

determining the third PMI according to the third measurement configuration information and the third RI, where a port quantity of the third PMI is a port quantity of a pilot in the third measurement configuration information, and an RI of the third PMI is the third RI; or determining the fourth PMI according to the first channel information, where a port quantity of the fourth PMI is a port quantity of a pilot in the first measurement configuration information, and an RI of the fourth PMI is the first RI; or determining the fourth PMI according to the first channel information and the second channel information, where a port quantity of the fourth PMI is a port quantity of a pilot in the first measurement configuration information, and an RI of the fourth PMI is the second RI; or determining the fourth PMI according to the first channel information and third channel information, where a port quantity of the fourth PMI is a port quantity of a pilot in the first measurement configuration information, and an RI of the fourth PMI is the third RI; or determining the fourth PMI according to the second channel information and the third channel information, where a port quantity of the fourth PMI is a product of a port quantity of a pilot in the second measurement configuration information and a port quantity of a pilot in the third measurement configuration information, and an RI of the fourth PMI is a product of the second RI and the third RI, or is min(the first RI, a product of the second RI and the third RI); or determining the fourth PMI according to the first channel information, the second channel information, and the third channel information, where a port quantity of the fourth PMI is a port quantity of a pilot in the first measurement configuration information, and an RI of the fourth PMI is a product of the second RI and the third RI, or is min(the first RI, a product of the second RI and the third RI), where min is an operation of obtaining a minimum value.

A precoding matrix corresponding to the fourth PMI is a Kronecker product of a precoding matrix corresponding to a second PMI and a precoding matrix corresponding to the third PMI; or a precoding matrix corresponding to the fourth PMI is a matrix obtained by performing column selection on a Kronecker product of a precoding matrix corresponding to a second PMI and a precoding matrix corresponding to the third PMI; or a precoding matrix corresponding to the fourth PMI is X columns in the Kronecker product of the precoding matrix corresponding to the second PMI and the precoding matrix corresponding to the third PMI; or a precoding matrix corresponding to the fourth PMI is X columns in a Kronecker product of the precoding matrix corresponding to the third PMI and the precoding matrix corresponding to the second PMI. X is configured by the base station for the terminal by using upper layer signaling or dynamic signaling, X columns may be continuous or discontinuous columns, and X is min(the first RI, the product of the second RI and the third RI).

The CQI in the third CSI includes a third CQI and a fourth CQI, and the measuring, by the terminal, the third channel further includes: determining the third CQI according to the third PMI; or determining the fourth CQI according to the fourth PMI.

In this embodiment, a pattern of a first channel measurement reference pilot in the first measurement configuration information, a pattern of a second channel measurement reference pilot in the second measurement configuration information, and a pattern of a third channel measurement reference pilot in the third measurement configuration information meet that:

the pattern of the second channel measurement reference pilot is a subset of the pattern of the first channel measurement reference pilot; and the pattern of the third channel measurement reference pilot is a subset of the pattern of the first channel measurement reference pilot.

A port of a first channel measurement reference pilot in the first measurement configuration information, a port of a second channel measurement reference pilot in the second measurement configuration information, and a port of a third channel measurement reference pilot in the third measurement configuration information meet that:

a port quantity of the first channel measurement reference pilot is a product of a port quantity of the second channel measurement reference pilot and a port quantity of the third channel measurement reference pilot.

The port quantity of the second channel measurement reference pilot is greater than or equal to the port quantity of the third channel measurement reference pilot.

A rank in the second channel information is greater than or equal to a rank in the third channel information.

A sending period of the first channel measurement reference pilot is an integer multiple of a sending period of the second channel measurement reference pilot, and the sending period of the first channel measurement reference pilot is an integer multiple of a sending period of the third channel measurement reference pilot.

In this embodiment, when the first channel measurement information includes the first CSI, the first CSI may be obtained by configuring, by the base station, a first CSI process, and measuring, by the terminal, the first channel according to the first measurement configuration information configured by the base station. The base station may not configure the first CSI process, and the first CSI may be obtained by measuring, by the base station, an uplink signal and sent to the terminal. Because the base station measures the uplink signal based on a whole antenna, channel measurement accuracy may also be improved.

The acquiring, by the terminal, the first channel information includes:

receiving, by the terminal, the first measurement configuration information sent by the base station; and measuring the first channel according to the first measurement configuration information, to obtain the first CSI.

Measurement on the first channel includes:

determining the first PMI according to the first measurement configuration information and the first RI, where a port quantity of the first PMI is a port quantity of a pilot in the first measurement configuration information, and an RI of the first PMI is the first RI; or when a precoding matrix $W(1)$ corresponding to the first PMI is of a dual-codebook structure, that is, $W(1)=W1(1) \times W2(1)$, determining a first sub PMI, where a precoding matrix corresponding to the first sub PMI is $W1(1)$; or determining the second PMI according to a measurement pilot in the second measurement configuration information, where a port quantity of the precoding matrix corresponding to the second PMI is a port quantity of a pilot in the second measurement configuration information, and an RI of the second PMI is the second RI; or determining the third PMI according to a measurement pilot in the third measurement configuration information, where a port quantity of the precoding matrix corresponding to the third PMI is a port quantity of a pilot in the third measurement configuration information, and an RI of the third PMI is the third RI; or a location of a port corresponding to a second measurement pilot being indicated in a measurement pilot in the first measurement configuration information, and determining, according to the port corresponding to the second measurement pilot, precoding indicator information, a second sub PMI, corresponding to W1(2) of long-term wideband, where a second precoding matrix W(2)=W1(2)×W2(2); or a location of a port corresponding to a third measurement pilot being indicated in a measurement pilot in the first measurement configuration information, and determining, according to the port corresponding to the third measurement pilot, precoding indicator information, a third sub PMI, corresponding to W1(3) of long-term wideband, where a third precoding matrix W(3)=W1(3)×W2(3).

A first CQI is determined in a transmit diversity manner according to the first measurement configuration information; or a first CQI is determined in an open-loop spatial multiplexing manner according to the first measurement configuration information; or a first CQI is determined by using the first PMI according to the first measurement configuration information; or a first CQI is determined by using the first PMI with a fixed RI according to the first measurement configuration information; or a first CQI is determined according to the first PMI; or a first CQI is determined according to the first sub PMI; or a second CQI is determined according to the second PMI; or a second CQI is determined according to the second sub PMI; or a third CQI is determined according to the third PMI; or a third CQI is determined according to the third sub PMI.

W of a dual-codebook structure=W1×W2, which is as follows:

$$W1 = \begin{bmatrix} X & 0 \\ 0 & X \end{bmatrix}$$

W1 is a block diagonal matrix, and the block diagonal matrix W1 is used for performing matching on changes of spatial features between co-polarized antennas. W2 is mainly used for performing phase selection on different-polarized antennas for W1 and column selection on W1.

After measuring channel information, the terminal further reports measured channel information to the base station, which specifically includes:

reporting the first CSI of the first channel, where the first CSI includes:
the first RI; or
the first RI and the first CQI; or
the first RI and the first PMI; or
the first RI, the first PMI, and the first CQI; or
the first RI and the first sub PMI; or
the first RI, the first sub PMI, and the first CQI; or
the first RI and the second PMI; or
the first RI, the second PMI, and the second CQI; or
the first RI and the third PMI; or
the first RI, the third PMI, and the third CQI; or
the first RI and the second sub PMI; or
the first RI, the second sub PMI, and the second CQI; or
the first RI and the third sub PMI; or
the first RI, the third sub PMI, and the third CQI.

The method further includes: reporting the third CSI of the third channel, where the third CSI includes:
the third RI, the third PMI, and the third CQI; or
the third RI, the third PMI, and a difference between the third CQI and the first CQI; or
the third RI, the third PMI, and a difference between the third CQI and the second CQI; or the third RI, the third PMI, the third CQI, and the fourth CQI; or
the third RI, the third PMI, the third CQI, and a difference between the fourth CQI and the first CQI; or
the third RI, the third PMI, the third CQI, and a difference between the fourth CQI and the third CQI; or
the third RI, the third PMI, and the fourth CQI; or
the third RI, the third PMI, and a difference between the fourth CQI and the first CQI; or
the third RI, the third PMI, and a difference between the fourth CQI and the second CQI; or
the third RI, the third PMI, and a difference between the fourth CQI and the third CQI; or
the third RI, the third PMI, the fourth PMI, the third CQI, and the fourth CQI; or
the third RI, the third PMI, the fourth PMI, the third CQI, and a difference between the fourth CQI and the first CQI; or
the third RI, the third PMI, the fourth PMI, the third CQI, and a difference between the fourth CQI and the second CQI; or
the third RI, the third PMI, the fourth PMI, the third CQI, and a difference between the fourth CQI and the third CQI; or
the third RI, the third PMI, the fourth PMI, and the fourth CQI; or
the third RI, the third PMI, the fourth PMI, and a difference between the fourth CQI and the first CQI; or
the third RI, the third PMI, the fourth PMI, and a difference between the fourth CQI and the second CQI; or
the third RI, the third PMI, the fourth PMI, and a difference between the fourth CQI and the third CQI; or
the third PMI and the third CQI; or
the third PMI and a difference between the third CQI and the first CQI; or
the third PMI and a difference between the third CQI and the second CQI; or the third RI, the third PMI, the third CQI, and the fourth CQI; or
the third PMI, the third CQI, and a difference between the fourth CQI and the first CQI; or
the third PMI, the third CQI, and a difference between the fourth CQI and the third CQI; or
the third PMI and the fourth CQI; or
the third PMI and a difference between the fourth CQI and the first CQI; or
the third PMI and a difference between the fourth CQI and the second CQI; or
the third PMI and a difference between the fourth CQI and the third CQI; or
the third PMI, the fourth PMI, the third CQI, and the fourth CQI; or
the third PMI, the fourth PMI, the third CQI, and a difference between the fourth CQI and the first CQI; or the third PMI, the fourth PMI, the third CQI, and a difference between the fourth CQI and the second CQI; or the third PMI, the fourth PMI, the third CQI, and a difference between the fourth CQI and the third CQI; or the third PMI, the fourth PMI, and the fourth CQI; or the third PMI, the fourth PMI, and a difference between the fourth CQI and the first CQI; or the third PMI, the fourth PMI, and a difference between the fourth CQI and the second CQI; or the third PMI, the fourth PMI, and a difference between the fourth CQI and the third CQI.

Specifically, a manner of reporting the third CSI is as follows:

when the precoding matrix W(1) corresponding to the first PMI is of a dual-codebook structure, that is, W(1)=W1(1)×W2(1), the fourth PMI corresponding to W2(1) is reported; or when the precoding matrix W(2) corresponding to the second PMI is of a dual-codebook structure, that is, W(2)=W1(2)×W2(2), and the precoding matrix W(3) corresponding to the third PMI is of a dual-codebook structure, that is, W(3)=W1(3)×W2(3), the fourth PMI is reported, where the precoding matrix corresponding to the fourth PMI is a matrix obtained by making a Kronecker product of W2(2) and W2(3); or when the precoding matrix W(2) corresponding to the second PMI is of a dual-codebook structure, that is, W(2)=W1(2)×W2(2), and the precoding matrix W(3) corresponding to the third PMI is of a dual-codebook structure, that is, W(3)=W1(3)×W2(3), the fourth PMI is reported, where the precoding matrix corresponding to the fourth PMI is a matrix obtained by making a Kronecker product of W1(2) and W1(3).

In the foregoing channel measurement method, measurement on the first channel, measurement on the second channel, and measurement on the third channel respectively correspond to a first CSI process, a second CSI process, and a third CSI process. In a reporting process for the first, the second, and the third CSI processes:

a period of reporting an RI for the first CSI process is a first integer multiple of a period of reporting an RI for the second CSI process, and the period of reporting the RI for the first CSI process is a first integer multiple of a period of reporting an RI for the third CSI process;

a period of reporting a PMI for the first CSI process is a second integer multiple of a period of reporting a PMI for the second CSI process, and the period of reporting the PMI for the first CSI process is a second integer multiple of a period of reporting a PMI for the third CSI process; and a period of reporting a CQI for the first CSI process is a third integer multiple of a period of reporting a CQI for the second CSI process, and the period of reporting the CQI for the first CSI process is a third integer multiple of a period of reporting a CQI for the third CSI process.

Numbers of bundled CSI processes, in which a restrictive CSI measurement range is used, are configured by using upper layer signaling or dynamic signaling of the base station.

The terminal reports a CSI measurement flag indicating whether to use a restrictive CSI measurement range.

The terminal first reports CSI information obtained when no restrictive CSI measurement range is used, then, reports a restrictive measurement flag indicating that a restrictive CSI measurement range needs to be used, and then, reports CSI information obtained when the restrictive CSI measurement range is used.

The terminal first reports CSI information obtained when a first restrictive CSI measurement range is used, then, reports a restrictive measurement flag indicating that a second restrictive CSI measurement range needs to be used, and then, reports CSI information obtained when the second restrictive CSI measurement range is used.

The terminal first reports CSI information obtained when no restrictive CSI measurement range is used, and then, receives a restrictive measurement flag indicating that a restrictive CSI measurement range needs to be used, which is notified by the base station by using upper layer signaling or dynamic signaling, and then, UE reports CSI information obtained when the restrictive CSI measurement range is used.

UE first reports CSI information obtained when a first restrictive CSI measurement range is used, and then, receives a restrictive measurement flag indicating that a second restrictive CSI measurement range needs to be used, which is notified by the base station by using upper layer signaling or dynamic signaling, and then, the UE reports CSI information obtained when the second restrictive CSI measurement range is used.

Restricting a CSI measurement range includes: restricting an RI measurement range, or restricting an antenna port quantity of a reported PMI.

When the first channel measurement information includes the first measurement configuration information, the first measurement configuration information is sent by the base station to the terminal, for example, may be configured for the terminal by using upper layer signaling, and is used by the terminal to measure the first channel, to obtain the first CSI.

It should be noted that, measurement on each of the foregoing channels may correspond to one CSI process, the base station may configure multiple CSI processes for the terminal, and in configuration of each CSI process, the base station configures a channel state information-reference signal (CSI-RS) resource (that is, configuration of a pilot), a channel state information-interference measurement (CSI-IM) resource, and the like for the terminal.

Figure 5:
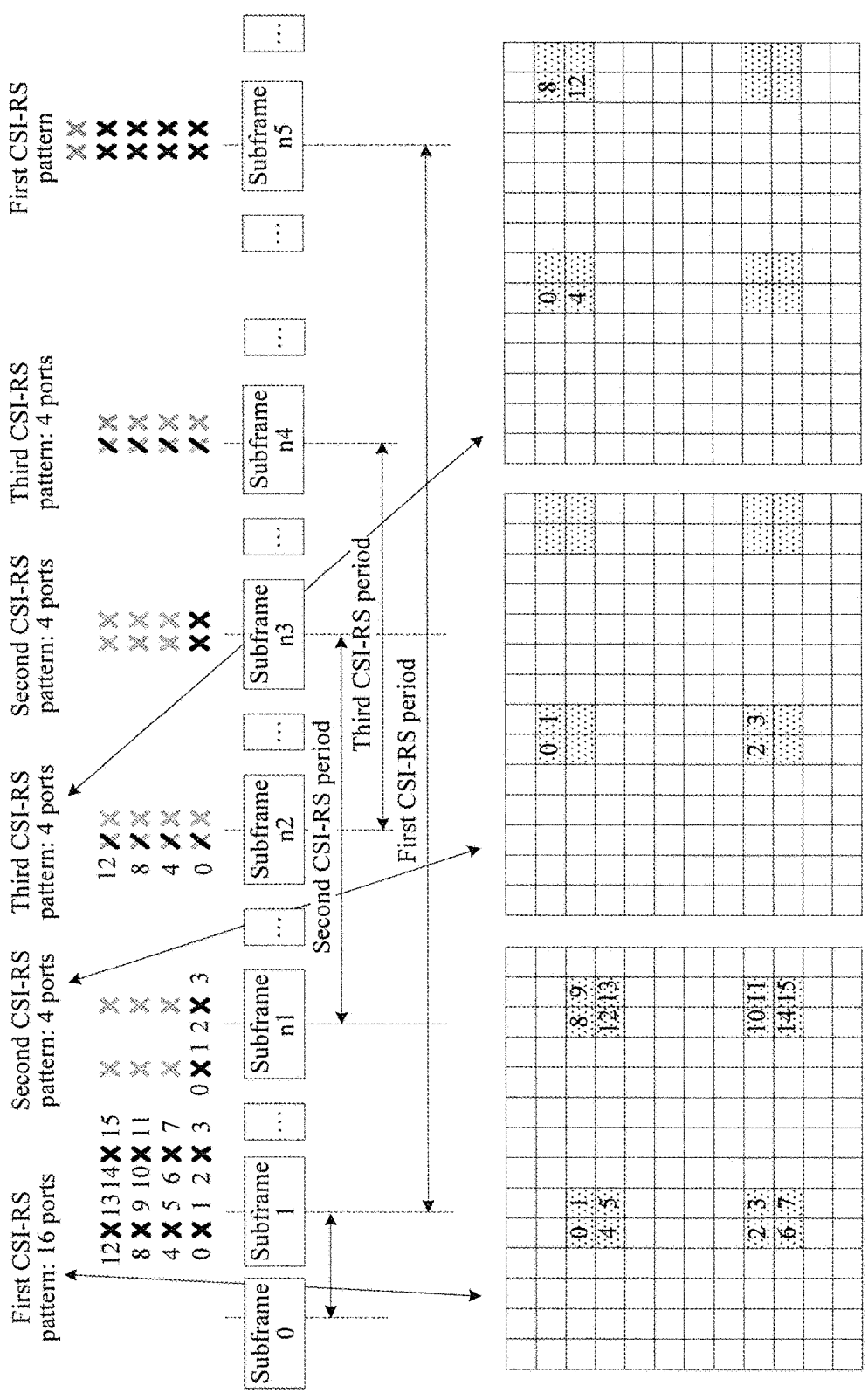
FIG. 5 is a schematic diagram of a measurement pilot in a channel measurement method according to an embodiment of the present invention.

An embodiment in which the base station configures three CSI processes for the terminal is described in detail below. Referring to FIG. 5, in this embodiment, a situation of configuration of a pilot is as follows:

1. N pieces of CSI-RS pilot configuration information (CSI-RS patterns) are configured, where N is a positive integer greater than 1, and a port quantity of one CSI-RS pattern thereof (a first CSI-RS pattern) is greater than a port quantity of at least one of rest CSI-RS patterns, and particularly, a port quantity of a first CSI-RS is a product of port quantities of other CSI-RSs. In FIG. 5, a port quantity of the first CSI-RS is 16, a port quantity of a second CSI-RS is 4, and the port of the second CSI-RS is a port in a horizontal direction, a port quantity of a third CSI-RS is 4, and the port of the third CSI-RS is a port in a vertical direction, and the port quantity of the first CSI-RS is product of the port quantity of the second CSI-RS and the port quantity of the third CSI-RS.

2. A rest CSI-RS pattern is a subset of the first CSI-RS pattern. For example, in FIG. 5, the 16 ports of the first CSI-RS pattern are separately mapped to shadow areas 0 to 15 in the figure; the 4 ports of the second CSI-RS pattern are separately mapped to locations of ports 0, 1, 2, and 3 in a subset of the first pattern; and the 4 ports of the third CSI-RS pattern are separately mapped to locations of ports 0, 4, 8, and 12 in the subset of the first pattern.

3. A sending period of the first CSI-RS pattern is greater than or equal to a sending period of a rest CSI-RS pattern.

For example, a subframe offset of sending of the first CSI-RS pattern is $\Delta_{CSI-RS,1}$, and a subframe offset of a sending period of a rest CSI-RS pattern is $\Delta_{CSI-RS,j}$, where j is an index of the CSI-RS pattern, j is not equal to 1, and subframe offsets of the CSI-RS patterns may be the same or may be different. A subframe period of sending of the first CSI-RS pattern is $T_{CSI-RS,1}$, and a subframe period of a sending period of a rest CSI-RS pattern is $T_{CSI-RS,j}$, where j is not equal to 1. That is, the sending period of the first CSI-RS pattern is an integer multiple of a sending period of at least one of other CSI-RS patterns: $T_{CSI-RS,1}=K \times T_{CSI-RS,j}$, where K is an integer, or $T_{CSI-RS,1} > T_{CSI-RS,j}$, and it is ensured that the first CSI-RS pattern does not conflict with another CSI-RS pattern. $(10n_f + \lfloor n_s/2 \rfloor - \Delta_{CSI-RS}) \bmod T_{CSI-RS} = 0$.

TABLE 1

CSI Reference signal subframe configuration table

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

Configuration on, measurement on, or a feedback to three groups of channel information corresponds to three CSI processes. The first CSI process corresponds to an antenna pattern of an entire 2D array, for example, corresponds to the first CSI-RS pattern in FIG. 5 (an antenna quantity is X(1)), where content in brackets is a group number of channel information; the second CSI process corresponds to a pattern with one row of horizontal antennas (an antenna quantity is X(2)), and corresponds to the second CSI-RS pattern in FIG. 5; and the third CSI process corresponds to a pattern with one column of vertical antennas (an antenna quantity is X(3)), and corresponds to the third CSI-RS pattern in FIG. 5.

a. Measurement and reporting of a first group of channel information include at least one of the following pieces of content:

measuring and reporting an RI of the first channel: a rank RI(1) according to the first CSI-RS pattern configured for the first CSI process;

measuring and reporting the first PMI according to the rank RI(1), where a port quantity of the precoding matrix W1(1) corresponding to the first PMI is a port quantity X(1) of a pilot configured for the first CSI process;

if the precoding matrix corresponding to the first PMI is of a dual-codebook structure, reporting precoding indicator information, the first sub PMI, corresponding to W1(1) of long-term wideband in the dual-codebook structure, where W(1)=W1(1)×W2(1);

a location of a port corresponding to the second CSI-RS pattern being indicated in the first CSI-RS pattern, and, precoding indicator information corresponding to W(2) that is reported according to the port corresponding to the second CSI-RS pattern being the second PMI;

the location of the port corresponding to the second CSI-RS pattern being indicated in the first CSI-RS pattern, and, precoding indicator information corresponding to W1(2) of long-term wideband that is reported according to the port corresponding to the second CSI-RS pattern being the second sub PMI, where W(2)=W1(2)×W2(2);

a location of a port corresponding to the third CSI-RS pattern being indicated in the first CSI-RS pattern, and, precoding indicator information corresponding to W(3) that is reported according to the port corresponding to the third CSI-RS pattern being the third PMI;

the location of the port corresponding to the third CSI-RS pattern being indicated in the first CSI-RS pattern, and, precoding indicator information corresponding to W1(3) of long-term wideband that is reported according to the port corresponding to the third CSI-RS pattern being the third sub PMI, where W(3)=W1(3)×W2(3);

the first CQI that is reported according to a reported RI by using a transmit diversity solution, or in an open-loop spatial multiplexing manner, or by using the first PMI, or by using the first sub PMI, or by using a specific PMI being CQI(1), where the specific PMI may be configured according to upper layer signaling or dynamic signaling;

measuring and reporting the second CQI, CQI(2), according to the second PMI or the second sub PMI; and measuring and reporting the third CQI, CQI(3), according to the third PMI or the third sub PMI.

b. Measurement and reporting of a second group of channel information include at least one of the following pieces of content:

an RI in the second group of channel information being RI(2), where RI(2) is associated with RI(1) in the first group of channel information, and there is a function relationship between RI (2) and RI(1), an expression form is RI(2)≤RI (1), RI(1) is an RI that is measured and reported according to the first CSI-RS pattern configured for the first CSI process, or RI(1) is obtained by the base station by measuring an uplink signal, and then is configured for the UE by using signaling, the uplink signal may be an SRS, the signaling may be dynamic signaling or upper layer signaling, and the UE measures, in a measurement range in which RI(2)≤RI(1), the RI in the second group of channel information according to the second CSI-RS pattern, and then reports the RI;

feeding back, by the UE, precoding information PMI(2) in the second group of channel information according to the reported RI(2), where a row quantity of the precoding matrix W(2) corresponding to PMI(2) is a port quantity X(2) of a measurement pilot configured in the second group of channel information, and a column quantity is the reported RI(2);

if W2(1) in the precoding matrix W(2) corresponding to PMI(2)=W1(2)×W2(2) is already reported in the first channel information, reporting, in the second channel information, precoding indicator information, information about the second sub PMI, corresponding to W2(2);

obtaining through measurement, by the UE, the second CQI: CQI(2) of the second channel, according to the reported RI: RI(2) of the second channel and the second PMI or the second sub PMI of the second channel, and reporting the second CQI: CQI(2); and assuming that in the second CSI process, a feedback mode is configured as a mode 1-1, if a dual-codebook PMI feedback mode is needed for an antenna quantity X2, W(2)=W1(2)×W2(2), where W1(2) is long-term wideband information, and W2(2) is short-team information; if it is a sub mode 1 of the mode 1-1, reporting RI(2) and W1(2) together, and reporting wideband CQI(2) and W2(2) together; or, if a sub mode 2 of the mode 1-1 is configured, separately reporting RI(2), and reporting W1(2), W2(2), and the wideband CQI(2) together; or if a dual-codebook PMI feedback is not needed for an antenna quantity X2, directly obtaining W(2) through measurement based on RI(2), where a dimension of PMI(2) is X2×RI(2), a row quantity is X2, and a column quantity is RI(2)).

c. Measurement and reporting of a third group of channel information include at least one of the following pieces of content:

an RI in the third group of channel information being RI(3), where RI(3) is associated with RI(1) in the first group of channel information and RI(2) in the second group of channel information, and there is a function relationship between RI(3) and RI(1) and RI(2), an expression form is floor(RI(1)/RI(2))≤RI(3)≤RI(1), floor is rounding down, RI(1) is an RI that is measured and reported according to the first CSI-RS pattern configured for the first CSI process, or RI(1) is obtained by the base station by measuring an uplink signal, and then is configured for the UE by using signaling, the uplink signal may be an SRS, the signaling may be dynamic signaling or upper layer signaling, RI(2) is an RI that is measured and reported according to the second CSI-RS pattern configured for the second CSI process, or RI(2) is obtained by the base station by measuring an uplink signal, and then is configured for the UE by using signaling, the uplink signal may be an SRS, and the signaling may be dynamic signaling or upper layer signaling; and feeding back, by the UE, third precoding information PMI(3) and/or fourth precoding information PMI(4) in the third group of channel information, where specifically:

the UE feeds back the precoding information PMI(3) in the third group of channel information according to the reported RI(3), where a row quantity of the precoding matrix W(3) corresponding to PMI(3) is a port quantity X(3) of a measurement pilot configured in the third group of channel information, and a column quantity is the reported RI(3), for example, if RI(1)=7, and RI(2)=2, according to floor(RI(1)/RI(2))≤RI(3)≤RI(1), it is obtained that a measurement range of RI(3) is 3≤RI(3)≤7, and assuming that RI(3)=3, the precoding matrix corresponding to the reported PMI(3) has 8 rows and 3 columns; or assuming that W(3) is of a dual-codebook structure, W(3)=W1(3)×W2(3), and the precoding indicator information corresponding to W1(3) is already reported in the first CSI process, in the third group of channel information, only precoding indicator information, denoted as the third PMI, corresponding to W2(3) is reported, and W(3) is obtained by combining W1(3) and W2(3), so as to calculate the third CQI.

When the precoding matrix W(1) corresponding to the first PMI is of a dual-codebook structure, that is, W(1)=W1(1)×W2(1), and precoding information corresponding to W1(1) is already reported in the first channel information, the fourth PMI, PMI(4), corresponding to W2(1) is reported; and/or the UE feeds back precoding information PMI(4) in a fourth group of channel information according to RI(1) in the first group of channel information, where a row quantity of a precoding matrix W(4) corresponding to PMI(4) that is fed back is the port quantity X(1) of the measurement pilot configured in the first group of channel information or is a product of the port quantity X(2) of the measurement pilot configured in the second group of channel information and a port quantity X(3) of a measurement pilot configured in the third group of channel information, for example, the row quantity is 64 ports, and the column quantity is RI(1) in the first group of channel information, or the column quantity is RI(2)×RI(3), or the column quantity is min(RI(1), RI(2)×RI(3)), where min is an operation of obtaining a minimum value, or the column quantity is max(RI(1), RI(2)×RI(3)).

For example, if RI(1)=7, and RI(2)=2, it is obtained, according to floor(RI(1)/RI(2))≤RI(3)≤RI(1), that the measurement range of RI(3) is 3≤RI(3)≤7, and assuming that the reported RI(3)=3, if the column quantity is RI(1), the precoding matrix corresponding to the reported PMI(4) has 64 rows and 7 columns; or if according to min(RI(1), RI(2)×RI(3)), it is obtained that the column quantity is min(7, 2×3)=6, the precoding matrix corresponding to the reported PMI(4) has 64 rows and 6 columns. In addition, PMI(4) may be obtained according to PMI(2) and PMI(3). For example, a dimension of the combined W(4) obtained by using W(4)=W(2)⊗W(3) is (X(2)×X(3))×(RI(2)×RI(3)), where ⊗ is a Kronecker product, the row quantity of W(4) is (X(2)×X(3)), and the column quantity of W(4) is RI(2)×RI(3); or when the reported RI(3)=4, and it is obtained, according to min(RI(1), RI(2)×RI(3)), that min(7, 2×4)=7, the following matrix W is first obtained by using W(4)=W(2)⊗W(3) or W(3)⊗W(2), where a row quantity thereof is X(2)×X(3), a column quantity thereof is RI(2)×RI(3), a matrix in a dotted box is W(4), and the column quantity thereof is RI(1).

$$W = \begin{bmatrix} w_{0,0} & w_{0,1} & w_{0,2} & \cdots & w_{0,RI(2)*RI(3)-1} \\ w_{1,0} & w_{1,1} & w_{1,2} & \vdots & w_{1,RI(2)*RI(3)-1} \\ w_{2,0} & w_{2,1} & w_{2,2} & \vdots & w_{2,RI(2)*RI(3)-1} \\ \vdots & \vdots & \vdots & & \vdots \\ w_{X2*X3-1,0} & w_{X2*X3-1,0} & \cdots & \cdots & w_{X2*X3-1,RI(2)*RI(3)-1} \end{bmatrix}$$

If A is an m×n matrix, and B is a p×q matrix, a Kronecker product of A⊗B is an mp×nq block matrix:

$$A \otimes B = \begin{bmatrix} a_{11}B & \cdots & a_{1n}B \\ \vdots & \ddots & \vdots \\ a_{m1}B & \cdots & a_{mn}B \end{bmatrix}$$

which may be more specifically expressed as:

$$A \otimes B = \begin{bmatrix} a_{11}b_{11} & a_{11}b_{12} & \cdots & a_{11}b_{1q} & \cdots & \cdots & a_{1n}b_{11} & a_{1n}b_{12} & \cdots & a_{1n}b_{1q} \\ a_{11}b_{11} & a_{11}b_{22} & \cdots & a_{11}b_{2q} & \cdots & \cdots & a_{1n}b_{21} & a_{1n}b_{22} & \cdots & a_{1n}b_{2q} \\ \vdots & \vdots & \ddots & \vdots & & & \vdots & \vdots & \ddots & \vdots \\ a_{11}b_{p1} & a_{11}b_{p2} & \cdots & a_{11}b_{pq} & \cdots & \cdots & a_{1n}b_{p1} & a_{1n}b_{p2} & \cdots & a_{1n}b_{pq} \\ \vdots & \vdots & & \vdots & \ddots & & \vdots & \vdots & & \vdots \\ \vdots & \vdots & & \vdots & & \ddots & \vdots & \vdots & & \vdots \\ a_{m1}b_{11} & a_{m1}b_{12} & \cdots & a_{m1}b_{1q} & \cdots & \cdots & a_{mn}b_{11} & a_{mn}b_{12} & \cdots & a_{mn}b_{1q} \\ a_{m1}b_{21} & a_{m1}b_{22} & \cdots & a_{m1}b_{2q} & \cdots & \cdots & a_{mn}b_{21} & a_{mn}b_{22} & \cdots & a_{mn}b_{2q} \\ \vdots & \vdots & \ddots & \vdots & & & \vdots & \vdots & \ddots & \vdots \\ a_{m1}b_{p1} & a_{m1}b_{p2} & \cdots & a_{m1}b_{pq} & \cdots & \cdots & a_{mn}b_{p1} & a_{mn}b_{p2} & \cdots & a_{mn}b_{pq} \end{bmatrix}$$

Then, W(4) is obtained by taking RI(1) columns of W. In a process of taking RI(1) columns, it is not necessary to select from the first column, and continuous RI(1) columns may be selected from the $P^{th}$ column; and it is not necessary to take continuous RI(1) columns during selection, and selection may be performed in a discrete manner. The column selection process may be performed on a UE side or on a base station side. If it is performed on the UE side, the UE needs to feed back a column selection result, that is, PMI(4), to the base station, and may feed back selected X=RI(1) column flags to the base station, and report whether W is W(2)⊗W(3) or is W(3)⊗W(2) to the base station, that is, notify an order of a Kronecker product to the base station, or it is default that the order of the Kronecker product is that a matrix with a larger antenna quantity in W(2) and W(3) is in front, or a matrix with a larger rank in W(2) and W(3) is in front; and the UE calculates the fourth CQI, CQI(4), according to the obtained W(4).

The UE obtains CQI(3) through measurement according to the reported RI(3) and PMI(3), and reports CQI(3), and/or the UE obtains CQI(4) through measurement according to the reported PMI(4) and reports CQI(4), where CQI(4) may be obtained by using a difference between CQI(4) and CQI(3), or obtained by using a difference between CQI(4) and CQI(2), or obtained by using a difference between CQI(4) and CQI(1).

d. Measurement and reporting of the RI in the third group of channel information further includes: (another formula of the RI measurement range):

the RI in the third group of channel information being RI(3), where RI(3) is associated with RI(1) in the first group of channel information and RI(2) in the second group of channel information, and there is a function relationship between RI(3) and RI(1) and RI(2), an expression form is ceil(RI(1)/RI(2))≤RI(3)≤RI(1), ceil is rounding up, RI(1) is an RI that is measured and reported according to the first CSI-RS pattern configured for the first CSI process, or RI(1) is obtained by the base station by measuring an uplink signal, and then is configured for the UE by using signaling, the uplink signal may be an SRS, the signaling may be dynamic signaling or upper layer signaling, RI(2) is an RI that is measured and reported according to the second CSI-RS pattern configured for the second CSI process, or RI(2) is obtained by the base station by measuring an uplink signal, and then is configured for the UE by using signaling, the uplink signal may be an SRS, and the signaling may be dynamic signaling or upper layer signaling;

the RI in the third group of channel information being RI(3), where RI(3) is associated with RI(1) in the first group of channel information and RI(2) in the second group of channel information, and there is a function relationship between RI(3) and RI(1) and RI(2), an expression form is RI(3)≤floor(RI(1)/RI(2)), floor is rounding down, RI(1) is an RI that is measured and reported according to the first CSI-RS pattern configured for the first CSI process, or RI(1) is obtained by the base station by measuring an uplink signal, and then is configured for the UE by using signaling, the uplink signal may be an SRS, the signaling may be dynamic signaling or upper layer signaling, RI(2) is an RI that is measured and reported according to the second CSI-RS pattern configured for the second CSI process, or RI(2) is obtained by the base station by measuring an uplink signal, and then is configured for the UE by using signaling, the uplink signal may be an SRS, and the signaling may be dynamic signaling or upper layer signaling;

the RI in the third group of channel information being RI(3), where RI(3) is associated with RI(1) in the first group of channel information and RI(2) in the second group of channel information, and there is a function relationship between RI(3) and RI(1) and RI(2), an expression form is RI(3)≤ceil(RI(1)/RI(2)), ceil is rounding up, RI(1) is an RI that is measured and reported according to the first CSI-RS pattern configured for the first CSI process, or RI(1) is obtained by the base station by measuring an uplink signal, and then is configured for the UE by using signaling, the uplink signal may be an SRS, the signaling may be dynamic signaling or upper layer signaling, RI(2) is an RI that is measured and reported according to the second CSI-RS pattern configured for the second CSI process, or RI(2) is obtained by the base station by measuring an uplink signal, and then is configured for the UE by using signaling, the uplink signal may be an SRS, and the signaling may be dynamic signaling or upper layer signaling;

the RI in the third group of channel information being RI(3), where RI(3) is associated with RI(1) in the first group of channel information and RI(2) in the second group of channel information, and there is a function relationship between RI(3) and RI(1) and RI(2), an expression form is RI(3)=floor(RI(1)/RI(2)), floor is rounding down, RI(1) is an RI that is measured and reported according to the first CSI-RS pattern configured for the first CSI process, or RI(1) is obtained by the base station by measuring an uplink signal, and then is configured for the UE by using signaling, the uplink signal may be an SRS, the signaling may be dynamic signaling or upper layer signaling, RI(2) is an RI that is measured and reported according to the second CSI-RS pattern configured for the second CSI process, or RI(2) is obtained by the base station by measuring an uplink signal, and then is configured for the UE by using signaling, the uplink signal may be an SRS, and the signaling may be dynamic signaling or upper layer signaling; and in this manner, RI(3) may be not reported, PMI(3) and/or PMI(4) are/is reported, and dimensions of PMI(3) and PMI(4) are the same as those in the foregoing descriptions; or the RI in the third group of channel information being RI(3), where RI(3) is associated with RI(1) in the first group of channel information and RI(2) in the second group of channel information, and there is a function relationship between RI(3) and RI(1) and RI(2), an expression form is RI(3)=ceil(RI(1)/RI(2)), ceil is rounding up, RI(1) is an RI that is measured and reported according to the first CSI-RS pattern configured for the first CSI process, or RI(1) is obtained by the base station by measuring an uplink signal, and then is configured for the UE by using signaling, the uplink signal may be an SRS, the signaling may be dynamic signaling or upper layer signaling, RI(2) is an RI that is measured and reported according to the second CSI-RS pattern configured for the second CSI process, or RI(2) is obtained by the base station by measuring an uplink signal, and then is configured for the UE by using signaling, the uplink signal may be an SRS, and the signaling may be dynamic signaling or upper layer signaling; and in this manner, RI(3) may be not reported, PMI(3) and/or PMI(4) are/is reported, and dimensions of PMI(3) and PMI(4) are the same as those in the foregoing descriptions.

Other several manners of determining the range of the third RI are as follows:

floor(RI(1)/RI(2))<RI(3)≤RI(1);
floor(RI(1)/RI(2))≤RI(3)<RI(1);
floor(RI(1)/RI(2))<RI(3)<RI(1);
ceil(RI(1)/RI(2))<RI(3)≤RI(1);
ceil(RI(1)/RI(2))≤RI(3)<RI(1);
ceil(RI(1)/RI(2))<RI(3)<RI(1);
RI(3)<floor(RI(1)/RI(2)); and
RI(3)<ceil(RI(1)/RI(2)).

The foregoing several manners of determining the range of RI(3) may be configured by the base station for the UE by using upper layer signaling or dynamic signaling. For example, one of multiple manners of determining an RI measurement range may be selected and notified by using upper layer signaling or dynamic signaling, and switching may be performed between the multiple manners of determining an RI measurement range.

For whether to perform CSI measurement in a restrictive range, the UE may report a restrictive measurement flag for restricting a CSI measurement range or the base station configures a flag.

The UE reports a CSI measurement flag indicating whether to use a restrictive CSI measurement range.

For example, the UE first reports CSI measurement information obtained when no restrictive CSI measurement range is used, then, reports a restrictive measurement flag indicating that a restrictive CSI measurement range needs to be used, and then, reports CSI measurement information obtained when the restrictive CSI measurement range is used.

Alternatively, the UE first reports CSI measurement information obtained when a first restrictive CSI measurement range is used, then, reports a restrictive measurement flag indicating that a second restrictive CSI measurement range needs to be used, and then, reports CSI measurement information obtained when the second restrictive CSI measurement range is used.

Alternatively, the UE first reports CSI measurement information obtained when no restrictive CSI measurement range is used, then, the base station notifies, by using upper layer signaling or dynamic signaling, a restrictive measurement flag indicating that a restrictive CSI measurement range needs to be used, and then, the UE reports CSI measurement information obtained when the restrictive CSI measurement range is used.

Alternatively, the UE first reports CSI measurement information obtained when a first restrictive CSI measurement range is used, then, the base station notifies, by using upper layer signaling or dynamic signaling, a restrictive measurement flag indicating that a second restrictive CSI measurement range needs to be used, and then, the UE reports CSI measurement information obtained when the second restrictive CSI measurement range is used.

Restrictive measurement in which a CSI range is restricted includes: restricting a range of an RI, restricting a range of a PMI, and restricting a range of a CQI. Restricting a range of a PMI includes: restricting a set of PMIs, for example, a set of PMIs corresponding to different antenna ports.

1) A combination relationship of reported content in the first group of channel information is as follows:
the first RI; or
the first RI and the first CQI; or
the first RI and the first PMI; or
the first RI, the first PMI, and the first CQI; or
the first RI and the first sub PMI; or
the first RI, the first sub PMI, and the first CQI; or
the first RI and the second PMI; or
the first RI, the second PMI, and the second CQI; or
the first RI and the third PMI; or
the first RI, the third PMI, and the third CQI; or
the first RI and the second sub PMI; or
the first RI, the second sub PMI, and the second CQI; or
the first RI and the third sub PMI; or
the first RI, the third sub PMI, and the third CQI.

Each of the foregoing combinations may further include a restrictive measurement flag of a CSI measurement range.

Figure 6:
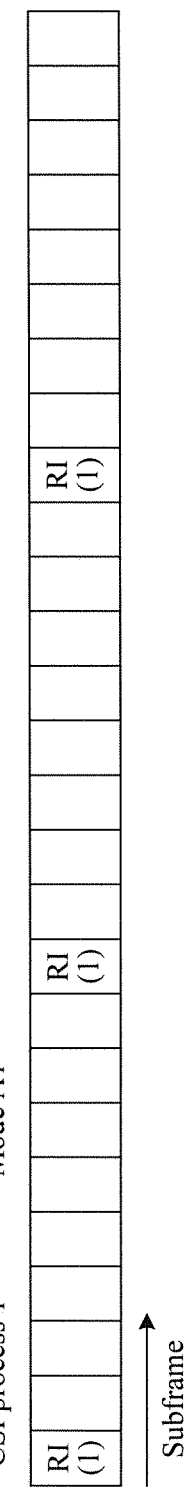
FIG. 6 is a diagram of a time sequence relationship of reported content in a first group of channel information in the method according to an embodiment of the present invention.
Figure 7:
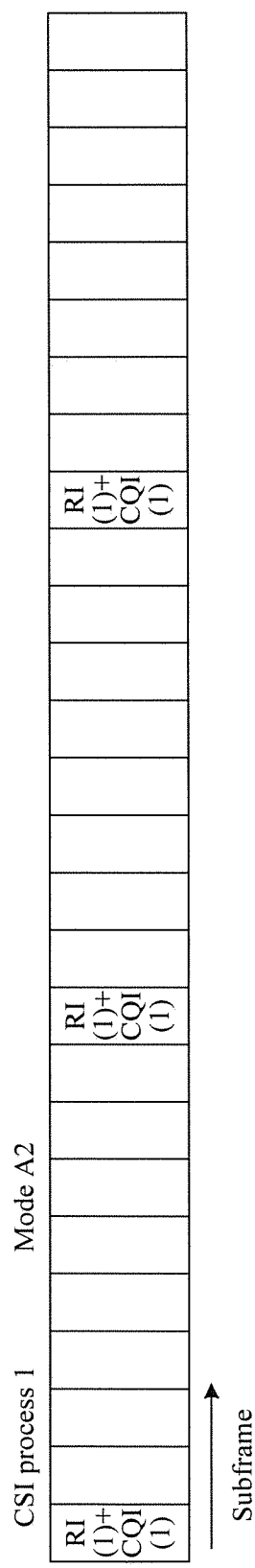
FIG. 7 is a diagram of another time sequence relationship of reported content in the first group of channel information in the method according to an embodiment of the present invention.
Figure 8:
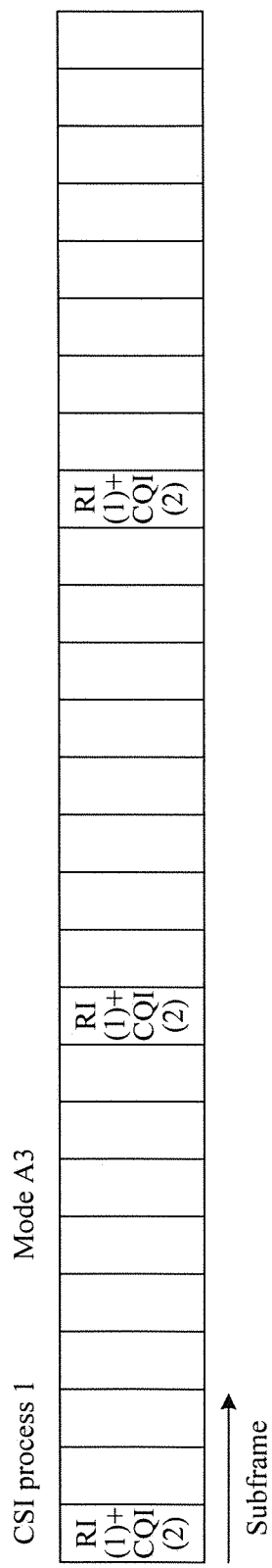
FIG. 8 is a diagram of still another time sequence relationship of reported content in the first group of channel information in the method according to an embodiment of the present invention.
Figure 9:
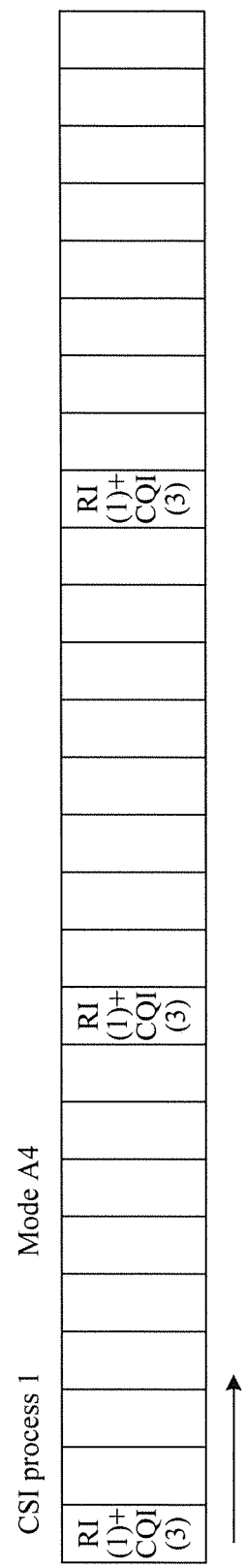
FIG. 9 is a diagram of still another time sequence relationship of reported content in the first group of channel information in the method according to an embodiment of the present invention.
Figure 10:
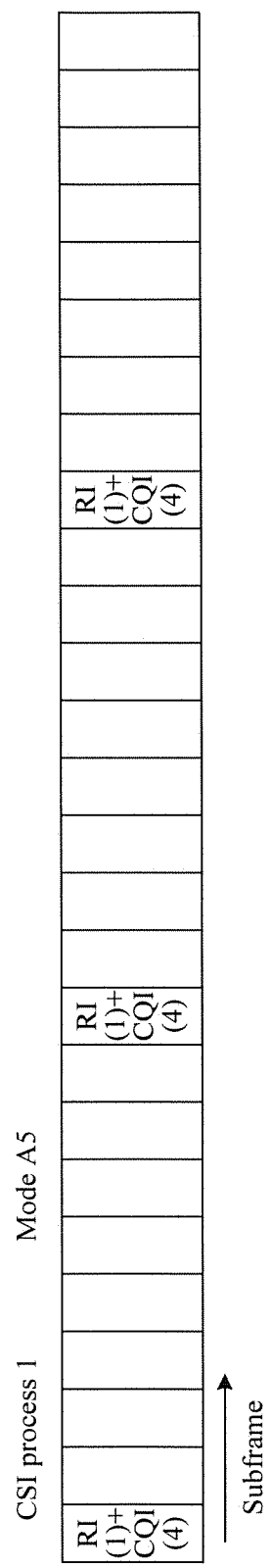
FIG. 10 is a diagram of still another time sequence relationship of reported content in the first group of channel information in the method according to an embodiment of the present invention.
Figure 11:
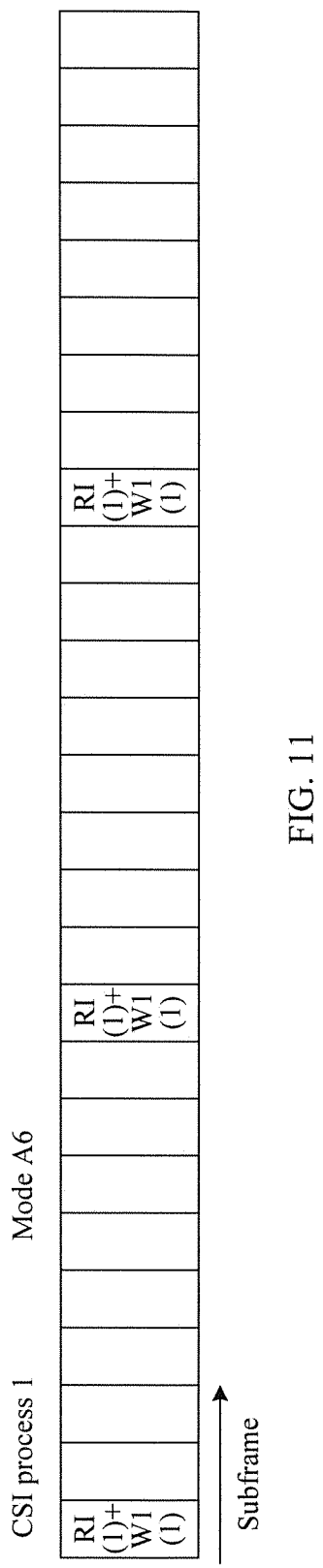
FIG. 11 is a diagram of still another time sequence relationship of reported content in the first group of channel information in the method according to an embodiment of the present invention.

2) A time sequence relationship of the reported content in the first group of channel information is as follows:
a) only RI(1) in the first group of channel information is reported, and a reporting time sequence relationship is shown in FIG. 6;

b) RI(1) and CQI(1) in the first group of channel information are reported together, and a reporting time sequence relationship is shown in FIG. 7;

c) RI(1) and CQI(2) in the first group of channel information are reported together, and a reporting time sequence relationship is shown in FIG. 8;

d) RI(1) and CQI(3) in the first group of channel information are reported together, and a reporting time sequence relationship is shown in FIG. 9;

e) RI(1) and CQI(4) in the first group of channel information are reported together, and a reporting time sequence relationship is shown in FIG. 10; or f) RI(1) and W1(1) in the first group of channel information are reported together, W1(4) is a precoding matrix of long-term wideband in a dual-codebook structure that is measured according to the first CSI-RS, W(1)=W1(1)×W2(1), and a reporting time sequence relationship is shown in FIG. 11.

3) A combination relationship of reported content in the third group of channel information is as follows:
a) the third RI, the third PMI, and the third CQI; or
b) the third RI, the third PMI, and a difference between the third CQI and the first CQI; or
c) the third RI, the third PMI, and a difference between the third CQI and the second CQI; or the third RI, the third PMI, the third CQI, and the fourth CQI; or
d) the third RI, the third PMI, the third CQI, and a difference between the fourth CQI and the first CQI; or
e) the third RI, the third PMI, the third CQI, and a difference between the fourth CQI and the third CQI; or
f) the third RI, the third PMI, and the fourth CQI; or
g) the third RI, the third PMI, and a difference between the fourth CQI and the first CQI; or
h) the third RI, the third PMI, and a difference between the fourth CQI and the second CQI; or
i) the third RI, the third PMI, and a difference between the fourth CQI and the third CQI; or
j) the third RI, the third PMI, the fourth PMI, the third CQI, and the fourth CQI; or
k) the third RI, the third PMI, the fourth PMI, the third CQI, and a difference between the fourth CQI and the first CQI; or
l) the third RI, the third PMI, the fourth PMI, the third CQI, and a difference between the fourth CQI and the second CQI; or
m) the third RI, the third PMI, the fourth PMI, the third CQI, and a difference between the fourth CQI and the third CQI; or
n) the third RI, the third PMI, the fourth PMI, and the fourth CQI; or
o) the third RI, the third PMI, the fourth PMI, and a difference between the fourth CQI and the first CQI; or
p) the third RI, the third PMI, the fourth PMI, and a difference between the fourth CQI and the second CQI; or
q) the third RI, the third PMI, the fourth PMI, and a difference between the fourth CQI and the third CQI; or
r) the third PMI and the third CQI; or
s) the third PMI and a difference between the third CQI and the first CQI; or
t) the third PMI and a difference between the third CQI and the second CQI; or the third RI, the third PMI, the third CQI, and the fourth CQI; or
u) the third PMI, the third CQI, and a difference between the fourth CQI and the first CQI; or
v) the third PMI, the third CQI, and a difference between the fourth CQI and the third CQI; or
w) the third PMI and the fourth CQI; or x) the third PMI and a difference between the fourth CQI and the first CQI; or y) the third PMI and a difference between the fourth CQI and the second CQI; or z) the third PMI and a difference between the fourth CQI and the third CQI; or aa) the third PMI, the fourth PMI, the third CQI, and the fourth CQI; or bb) the third PMI, the fourth PMI, the third CQI, and a difference between the fourth CQI and the first CQI; or cc) the third PMI, the fourth PMI, the third CQI, and a difference between the fourth CQI and the second CQI; or dd) the third PMI, the fourth PMI, the third CQI, and a difference between the fourth CQI and the third CQI; or ee) the third PMI, the fourth PMI, and the fourth CQI; or ff) the third PMI, the fourth PMI, and a difference between the fourth CQI and the first CQI; or gg) the third PMI, the fourth PMI, and a difference between the fourth CQI and the second CQI; or hh) the third PMI, the fourth PMI, and a difference between the fourth CQI and the third CQI.

Each of the foregoing combinations may further include a restrictive measurement flag of a CSI measurement range.

Figure 12:
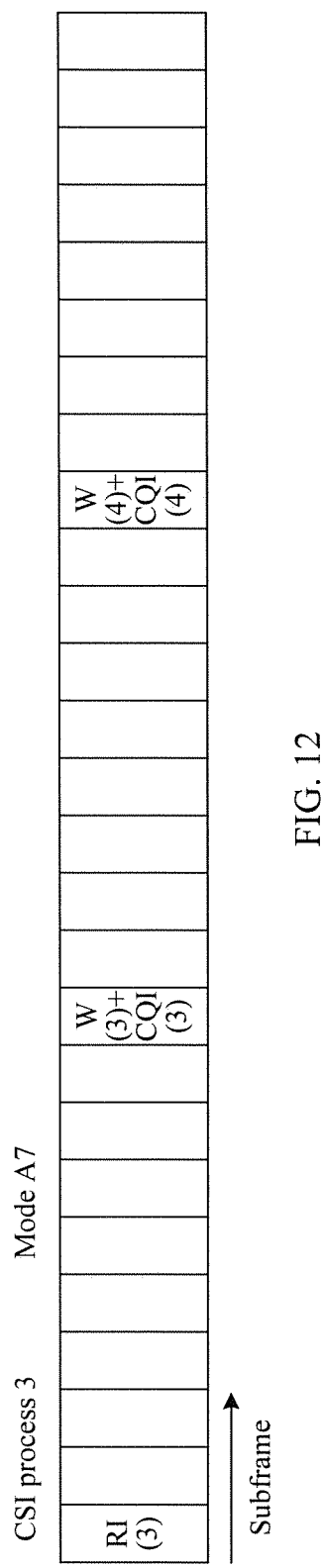
FIG. 12 is a diagram of a time sequence relationship of reported content in a third group of channel information in the method according to an embodiment of the present invention.
Figure 13:
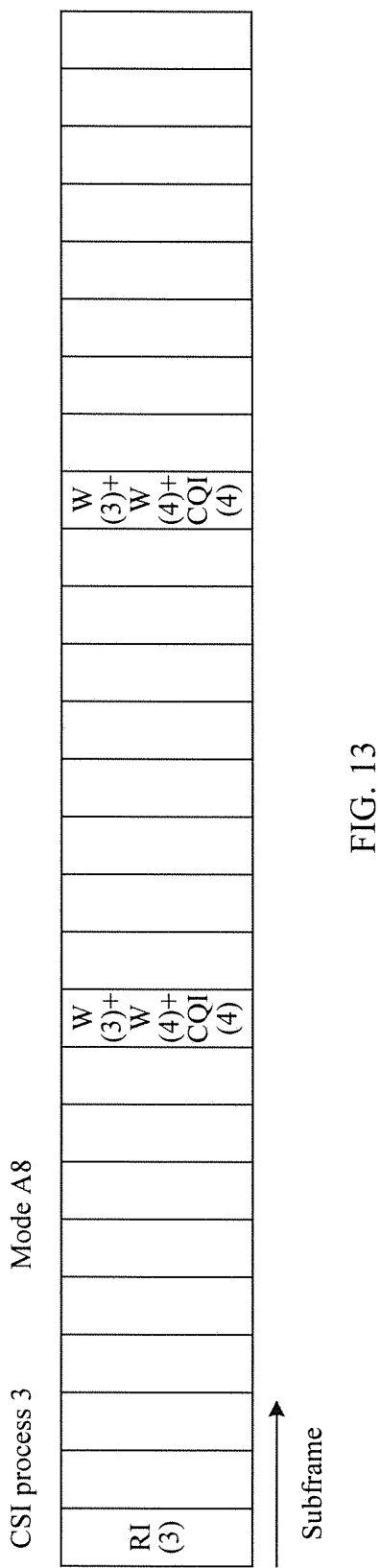
FIG. 13 is a diagram of another time sequence relationship of reported content in the third group of channel information in the method according to an embodiment of the present invention.
Figure 14:
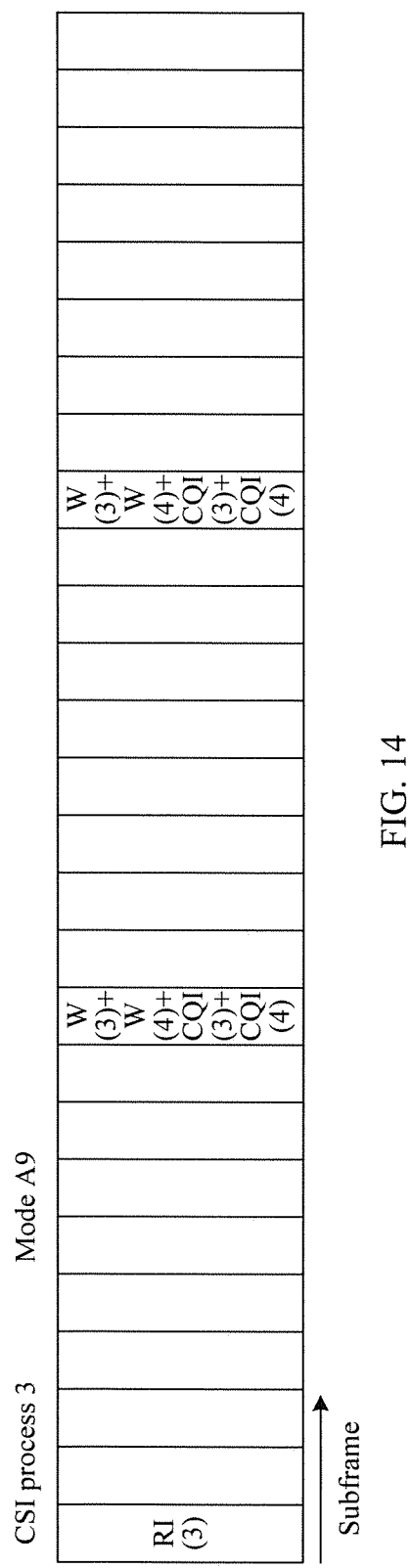
FIG. 14 is a diagram of still another time sequence relationship of reported content in the third group of channel information in the method according to an embodiment of the present invention.
Figure 15:
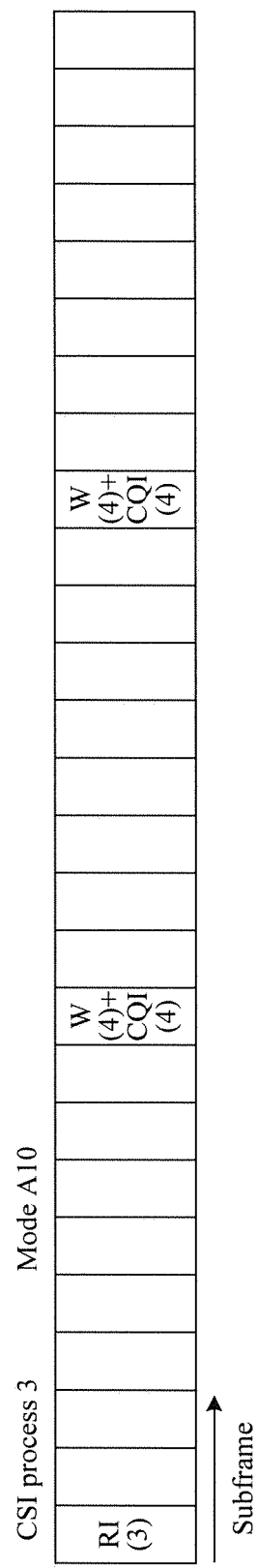
FIG. 15 is a diagram of still another time sequence relationship of reported content in the third group of channel information in the method according to an embodiment of the present invention.
Figure 16:
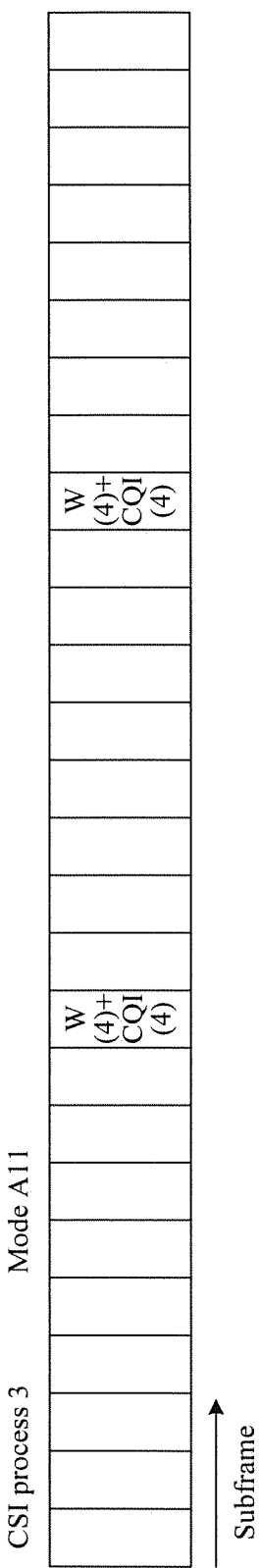
FIG. 16 is a diagram of still another time sequence relationship of reported content in the third group of channel information in the method according to an embodiment of the present invention.

4) A time sequence relationship of the reported content in the third group of channel information is as follows:

a) RI(3) in the third group of channel information is separately reported, W(3) and CQI(3) are reported together, W(4) and CQI(4) are reported together, a reporting period of W(4) is a maximal common divisor of reporting periods of W(2) and W(3), or is equal to min(a reporting period of W(2), a reporting period of W(3)), and a reporting time sequence relationship is shown in FIG. 12;

b) RI(3) in the third group of channel information is separately reported, W(3), W(4), and CQI(4) are reported together, and a reporting time sequence relationship is shown in FIG. 13;

c) RI(3) in the third group of channel information is separately reported, W(3), W(4), CQI(3), and CQI(4) are reported together, and a reporting time sequence relationship is shown in FIG. 14;

d) RI(3) in the third group of channel information is separately reported, W(4) and CQI(4) are reported together, and a reporting time sequence relationship is shown in FIG. 15; or e) when it does not need to report RI(3), W(4) and CQI(4) are reported together, and a reporting time sequence relationship is shown in FIG. 16.

For a CSI process 3, the mode 1-1 is configured, RI(3) is reported, and RI(3)=floor(R/RI(2)), or RI(3)=ceil(R/RI(2)). PMI(3) and/or PMI(4) are/is obtained through measurement based on RI(3) and reported. A dimension of PMI(3) is X3×RI(3). In addition, a total combined PMI is obtained based on r1, r2, PMI(2), and PMI(3), PMI(2) obtained based on a CSI process 2 is X1×RI(2), and a CQI is measured and reported. If X1 is greater than or equal to 8 antennas, a dual-codebook PMI feedback mode is needed, that is, if it is a sub mode 1 of the mode 1-1, r1 and W1 are reported together, and a wideband CQI and W2 are reported together. Alternatively, if the sub mode 2 of the mode 1-1 is configured, r1 is separately reported, and W1, W2, and a wideband CQI are reported together.

Alternatively, for a CSI process 1, a mode 1-0 is configured, a rank is reported as R, and a bit that is originally used to report a wideband CQI may be used to report a wideband W1(2) corresponding to the second CSI-RS pattern.

For the CSI process 2, the mode 1-1 is configured, r1 is reported, it is ensured that r1 is less than or equal to R, and 4 Tx W2(2) is measured based on r1 and reported.

For the CSI process 3, the mode 1-1 is configured, r2 is reported, (R/r1)≤r2≤R, and W2(3) is obtained through measurement based on r2 and reported. In addition, a CQI is measured based on r1, r2, PMI1, and PMI2 and reported.

The foregoing group of CSI processes that are mutually associated: the first CSI process, the second CSI process, and the third CSI process may be obtained by configuring, by the base station, numbers of bundled CSI processes.

For example, the base station configures five CSI processes:

a CSI process 0, the CSI process 1, the CSI process 2, the CSI process 3, and a CSI process 4, where the CSI process 0, the CSI process 2, and the CSI process 3 are configured by the base station as bundled and mutually associated three CSI processes. It may be considered by default that in order, the CSI process 0 is the first CSI process, the CSI process 2 is the second CSI process, the CSI process 3 is the third process; or a CSI process with a largest antenna quantity in these three CSI processes is the first CSI process, a CSI process with a second largest antenna quantity is the second CSI process, and a CSI process with a least antenna quantity is the third CSI process; or a CSI process with a largest antenna quantity is the first CSI process, a CSI with a larger rank in the remaining two CSI processes is the second CSI process, and the rest is the third CSI process.

TABLE 2

| CQI and PMI feedback types for a PUCCH CSI reporting mode | | | |
|---|---|---|---|
| | | PMI Feedback Type | |
| | | No PMI | Single PMI |
| PUCCH CQI feedback type | Wideband (wideband CQI) | Mode 1-0 | Mode 1-1 |
| | UE Selected (subband CQI) | Mode 2-0 | Mode 2-1 | where: Type 1: reporting a support CQI feedback and a subband feedback selected by the UE;

Type 1 a: reporting a subband CQI and the second PMI;

Type 2, Type 2b, and Type 2c: reporting a wideband CQI and a PMI feedback;

Type 2a: reporting a wideband PMI;

Type 3: reporting an RI;

Type 4a: reporting a wideband CQI;

Type 5: reporting an RI and a wideband PMI; and

Type 6: reporting an RI and a PTI.

A. Three non zero power CSI-RS patterns correspond to three CSI processes. Correlation exists among the three processes.

A whole rank is reported according to the first CSI-RS pattern (CSI process 1, X1=16 Tx).

A partial rank and a partial PMI are reported according to the second CSI-RS pattern (CSI process 2, X2=4 Tx).

A partial rank, a partial PMI, and a CQI are reported according to the third CSI-RS pattern (CSI process 3, X3=4 Tx).

For the CSI process 1, a mode 1-0 is configured. The mode 1-0 in R8 is configured in such a manner that content in the type 3 and type 4 is fed back, that is, RI(1) and a wideband CQI are fed back, and a quantity of bits for feeding back the RI is shown in Table 3. Alternatively, it may be configured in such a manner that only content in the type 4 is fed back, that is, only a wideband CQI is fed back.

In the solution, ports of the first CSI pattern may be 16, 32, 48, 64, . . . , and 128 transmit antennas, respectively corresponds to maximum RIs (1) 16, 32, . . . , and 128, and RIs (1) respectively need 4 bits, 5 bits, . . . , and 8 bits.

a1: Feedback content in the mode 1-0 is newly defined, and only content in the type 3 is fed back, that is, only RI(1) is fed back, the mode is defined as a mode A1, or RIs of multiple CSI processes are reported together. In another process, an RI does not need to be reported.

Alternatively, feedback content in the mode 1-0 is defined, and content in the type 3 and the type 4 is fed back, that is, RI(1) and CQI(1) are fed back, the mode is defined as a mode A2, the fed back CQI(1) is measured based on a CRS, and is a CQI calculated by using a transmit diversity or open-loop beamforming sending solution.

Alternatively, feedback content in the mode 1-0 is defined, and content in the type 3 (RI) and the type 4 (CQI) are fed back, where the CQI in type 4 is a CQI measured in another CSI process, the mode is defined as a mode A3, and the fed back CQI(2) is calculated based on the second CSI-RS pattern, or is a CQI calculated based on a third CSI-RS pattern.

Figure 18:
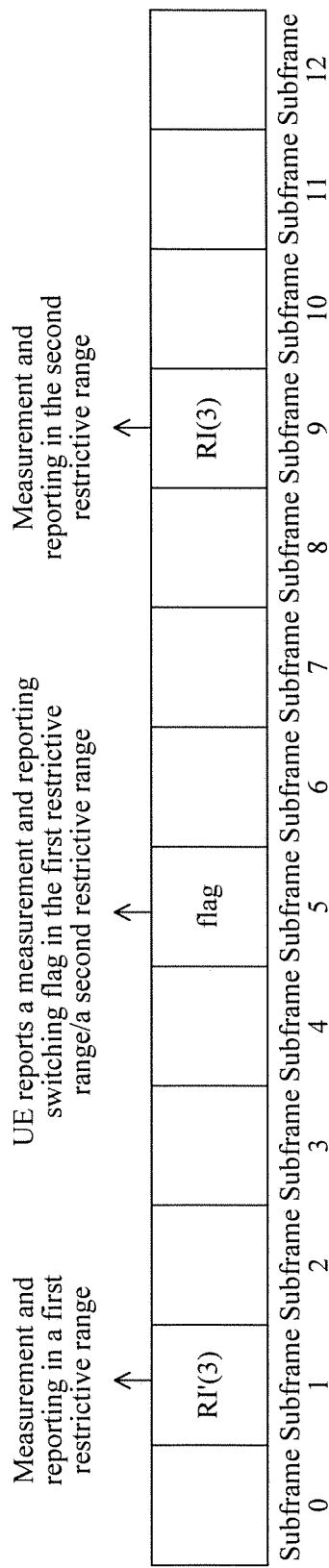
FIG. 18 is another diagram of a time sequence relationship of reported content according to an embodiment of the present invention.

Alternatively, a flag in FIG. 18 may further represent a change of a restrictive CSI measurement range and a restrictive CSI reporting range. For example, RI measurement before the flag is reported is performed in RI'(3)∈C1. For example, C1 is a positive integer greater than or equal to ceil(RI(1)/RI(2)). After the flag is reported, an RI measurement range changes to RI(3)∈C2. For example, C2 is a positive integer greater than or equal to floor(RI(1)/RI(2)) and less than RI(1).

Figure 19:
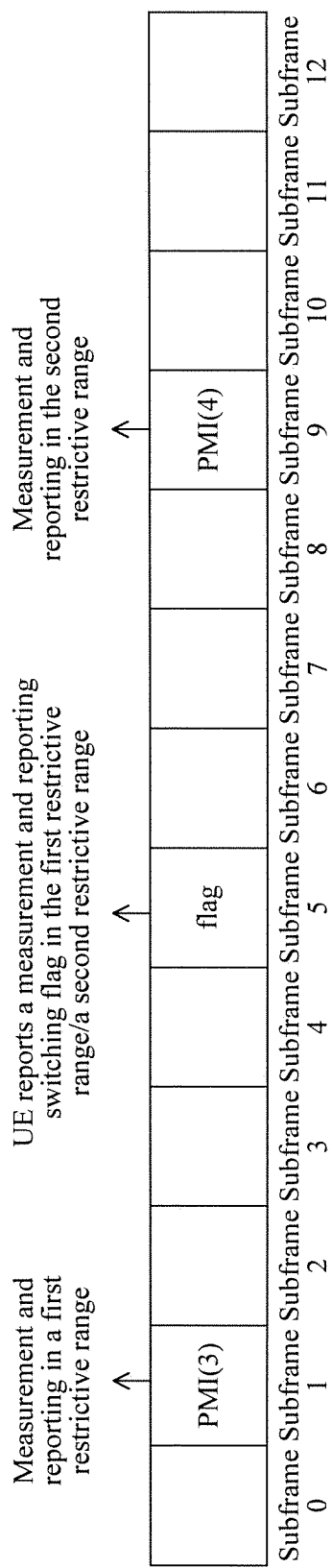
FIG. 19 is still another diagram of a time sequence relationship of reported content according to an embodiment of the present invention.

The example provided above is a restrictive RI range. As shown in FIG. 19, switching on a restrictive PMI range is provided below. PMI(3) is reported before the flag is reported. A measurement range of PMI(3) is PMI(3)∈C3. For example, C3 is a set of PMIs with an antenna port quantity of X(3). A measurement range of PMI(4) is PMI(4)∈C4. For example, C4 is a set of PMIs with an antenna port quantity of X(1).

Figure 20:
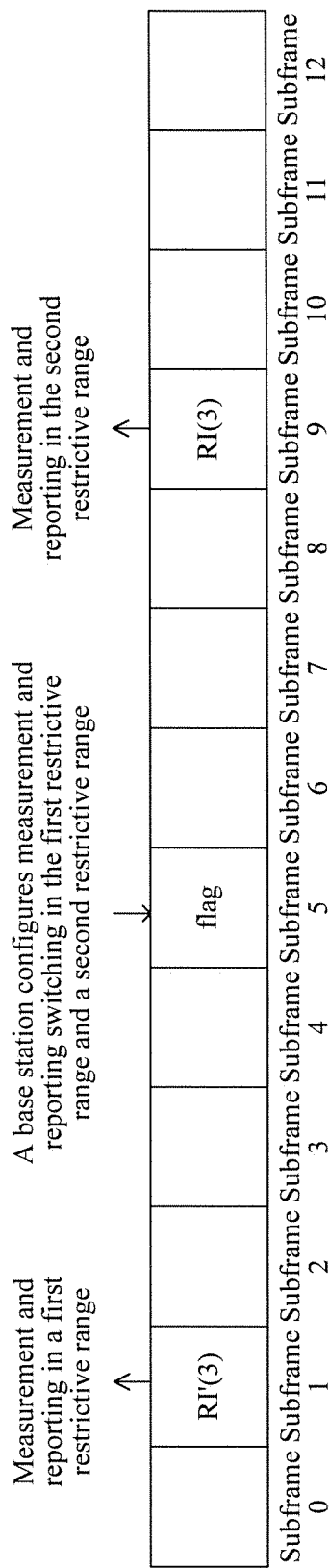
FIG. 20 is still another diagram of a time sequence relationship of reported content according to an embodiment of the present invention.
Figure 21:
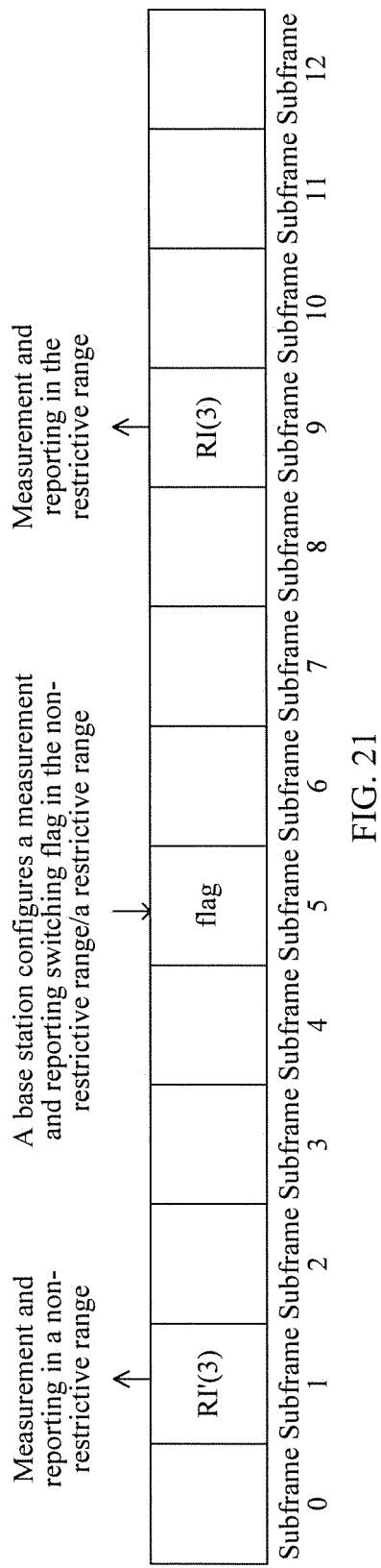
FIG. 21 is still another diagram of a time sequence relationship of reported content according to an embodiment of the present invention.

Alternatively, the flag is configured by the base station by using upper layer signaling or dynamic signaling, as shown in FIG. 20 and FIG. 21; and the flag of the restrictive CSI measurement range is also specific to the second RI, RI(2).

Another channel measurement method in an embodiment of the present invention is performed by a base station, and includes:

TABLE 3

| Field | Bit width | | | | | |
|---|---|---|---|---|---|---|
| | 2 antenna ports | 4 antenna ports | | 8 antenna ports | | |
| | | Max 2 layers | Max 4 layers | Max 2 layers | Max 4 layers | Max 8 layers |
| Rank indication | 1 | 1 | 2 | 1 | 2 | 3 |

| Field | Bit width | | | | | | | | |
|---|---|---|---|---|---|---|---|---|---|
| | 16 antenna ports | | | | 32 antenna ports | | | | |
| | Max 2 layers | Max 4 layers | Max 8 layers | Max 16 layers | Max 2 layers | Max 4 layers | Max 8 layers | Max 16 layers | Max 32 layers |
| Rank indication | 1 | 2 | 3 | 4 | 1 | 2 | 3 | 4 | 5 |

Figure 17:
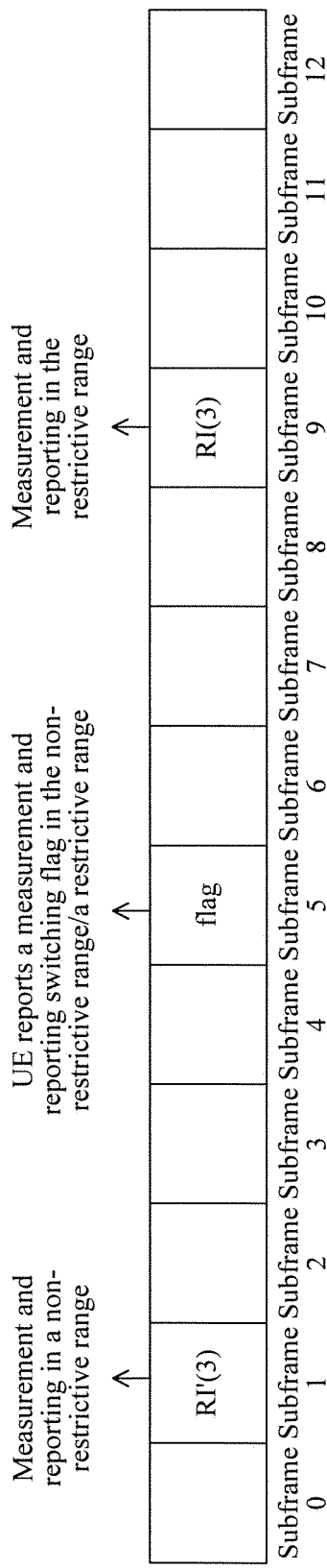
FIG. 17 is a diagram of a time sequence relationship of reported content according to an embodiment of the present invention.

For example, in FIG. 17, each grid represents a subframe, and a figure below represents a subframe number; therefore, before a subframe 5, measurement and reporting of CSI in the third channel state information are not performed in any restrictive range. An RI is taken as an example, and the solution in the example also applies to a PMI and a CQI. For example, RI'(3) is not measured and reported in the foregoing restrictive range, and PMI'(3) and CQI'(3) are calculated based on RP(3). For example, RI'(3) only needs to be less than or equal to a transmit antenna quantity, and there is no other restrictive conditions. From a moment of the subframe 5, the UE considers that reporting of the third channel state information should be started in a restrictive range, and therefore, reports a flag to notify the base station, and then, starts to measure and report CSI in the restrictive range, that is, RI(3) that starts to be reported from the fifth subframe is the third RI that is measured and reported in a restrictive range. For example, the third RI meets the restrictive range, RI(3)∈C2. Assuming that C2 is a positive integer less than or equal to ceil(RI(1)/RI(2)), RI(1) is an RI in the first channel information, RI(2) is an RI in the second channel information, RI(1)=7, and RI(2)=3, RI(3) can only be measured and reported in a range less than 3.

acquiring, by a base station, second CSI, where the second CSI is associated with first channel information, and the first channel information includes one or more of the following information: reported first channel state information (CSI) of a first channel, first channel state information (CSI) of the first channel that is configured by the base station, and first measurement configuration information used for measuring the first channel.

That the second CSI is associated with first channel information includes:

a second RI in the second CSI is associated with a first RI in the first CSI.

That a second RI in the second CSI is associated with a first RI in the first CSI includes:

the second RI≤the first RI; or the second RI<the first RI.

The method may further include:

acquiring, by the base station, third CSI, where the third CSI is associated with at least one of the first CSI and the second CSI.

That the third CSI is associated with at least one of the first CSI and the second CSI includes:

a third RI in the third CSI is associated with at least one of a first RI in the first CSI and a second RI in the second CSI; or a third RI in the third CSI is associated with at least one of a first RI in the first CSI and a configured RI in second channel information.

A manner of determining a measurement range of the second RI in the second CSI is notified by using upper layer signaling or dynamic signaling of the base station.

A manner of determining a measurement range of the third RI in the third CSI is notified by using upper layer signaling or dynamic signaling of the base station. For example, one of multiple manners of determining an RI measurement range may be selected and notified by using upper layer signaling or dynamic signaling, and switching may be performed between the multiple manners of determining an RI measurement range.

The range of the third RI includes:

the third RI≤the first RI, or the third RI<the first RI; or a value obtained by rounding a quotient of the first RI and the second RI≤the third RI≤the first RI, or a value obtained by rounding a quotient of the first RI and the second RI<the third RI≤the first RI, or a value obtained by rounding a quotient of the first RI and the second RI≤the third RI<the first RI, or a value obtained by rounding a quotient of the first RI and the second RI<the third RI<the first RI, where the rounding is rounding up or rounding down; or a value obtained by rounding a quotient of the first RI and the configured RI in the second channel information≤the third RI≤the first RI, or a value obtained by rounding a quotient of the first RI and the configured RI in the second channel information<the third RI≤the first RI, or a value obtained by rounding a quotient of the first RI and the configured RI in the second channel information≤the third RI<the first RI, or a value obtained by rounding a quotient of the first RI and the configured RI in the second channel information<the third RI<the first RI, where the rounding is rounding up or rounding down; or the third RI<a value obtained by rounding a quotient of the first RI and the second RI, or the third RI<a value obtained by rounding a quotient of the first RI and the second RI, where the rounding is rounding up or rounding down; or the third RI≤a value obtained by rounding a quotient of the first RI and the configured RI, or the third RI<a value obtained by rounding a quotient of the first RI and the configured RI, where the rounding is rounding up or rounding down; or the third RI=a value obtained by rounding a quotient of the first RI and the second RI, where the rounding is rounding up or rounding down; or the third RI=a value obtained by rounding a quotient of the first RI and the configured RI in the second channel information, where the rounding may be rounding up or rounding down.

The third CSI obtained by the base station includes a third PMI and/or a fourth PMI, where a port quantity of the third PMI is a port quantity of a pilot in the third measurement configuration information, and an RI of the third PMI is the third RI; or a port quantity of the fourth PMI is a port quantity of a pilot in the first measurement configuration information, and an RI of the fourth PMI is the first RI; or a port quantity of the fourth PMI is a port quantity of a pilot in the first measurement configuration information, and an RI of the fourth PMI is the second RI; or a port quantity of the fourth PMI is a port quantity of a pilot in the first measurement configuration information, and an RI of the fourth PMI is the third RI; or a port quantity of the fourth PMI is a product of a port quantity of a pilot in the second measurement configuration information and a port quantity of a pilot in the third measurement configuration information, and an RI of the fourth PMI is a product of the second RI and the third RI, or is min(the first RI, a product of the second RI and the third RI); or a port quantity of the fourth PMI is a port quantity of a pilot in the first measurement configuration information, and an RI of the fourth PMI is a product of the second RI and the third RI, or is min(the first RI, a product of the second RI and the third RI), where min is an operation of obtaining a minimum value.

A precoding matrix corresponding to the fourth PMI is a Kronecker product of a precoding matrix corresponding to a second PMI and a precoding matrix corresponding to the third PMI; or a precoding matrix corresponding to the fourth PMI is a matrix obtained by performing column selection on a Kronecker product of a precoding matrix corresponding to a second PMI and a precoding matrix corresponding to the third PMI.

The second PMI is a PMI, of which a port quantity is a port quantity of a pilot in the second measurement configuration information, in the second CSI, and the third PMI is a PMI, of which a port quantity is a port quantity of a pilot in the third measurement configuration information, in the third CSI.

The precoding matrix corresponding to the fourth PMI is:

X columns in the Kronecker product of the precoding matrix corresponding to the second PMI and the precoding matrix corresponding to the third PMI; or X columns in a Kronecker product of the precoding matrix corresponding to the third PMI and the precoding matrix corresponding to the second PMI.

The third CSI further includes:

a third CQI determined according to the third PMI; and/or a fourth CQI determined according to the fourth PMI.

The first CSI includes:

a first PMI, where when a precoding matrix W(1) corresponding to the first PM is of a dual-codebook structure, that is, $W(1)=W1(1)\times W2(1)$, a precoding matrix corresponding to a first sub PMI is W1(1); or the second PMI, where the second PMI is precoding indicator information corresponding to W(2) that is reported according to a port corresponding to a second CSI-RS pattern, the base station indicates, in a first CSI-RS pattern, a location of the port corresponding to the second CSI-RS pattern, and a second sub PMI received by the base station is precoding indicator information corresponding to W1(2) of long-term wideband that is reported according to the port corresponding to the second CSI-RS pattern, where $W(2)=W1(2)\times W2(2)$; and the third sub PMI, where the base station indicates a location of a port corresponding to a third CSI-RS pattern in the first CSI-RS pattern, and the third sub PMI received by the base station is precoding indicator information corresponding to W1(3) of long-term wideband that is reported according to the port corresponding to the third CSI-RS pattern, where $W(3)=W1(3)\times W2(3)$; and the first CSI includes:

when the precoding matrix W(2) corresponding to the second PMI is of a dual-codebook structure, that is, $W(2)=W1(2)\times W2(2)$, and the precoding matrix W(3) corresponding to the third PMI is of a dual-codebook structure, that is, W(3)=W1(3)×W2(3), the second PMI corresponding to W1(2), the third PMI corresponding to W1(3), and the first RI.

The first CQI in the first CSI includes:
a first CQI determined based on a transmit diversity manner; or
a first CQI determined based on an open-loop spatial multiplexing manner; or
a first CQI determined based on the first PMI; or
a first CQI determined based on a first PMI of a fixed RI; or
a first CQI determined according to the first PMI; or
a first CQI determined according to the first sub PMI; or
a second CQI determined according to the second PMI; or
a second CQI determined according to the second sub PMI; or
a third CQI determined according to the third PMI; or
a third CQI determined according to the third sub PMI.

The first CSI obtained by the base station includes:
the first RI; or
the first RI and the first CQI; or
the first RI and the first PMI; or
the first RI, the first PMI, and the first CQI; or
the first RI and the first sub PMI; or
the first RI, the first sub PMI, and the first CQI; or
the first RI and the second PMI; or
the first RI, the second PMI, and the second CQI; or
the first RI and the third PMI; or
the first RI, the third PMI, and the third CQI; or
the first RI and the second sub PMI; or
the first RI, the second sub PMI, and the second CQI; or
the first RI and the third sub PMI; or
the first RI, the third sub PMI, and the third CQI.

The third CSI obtained by the base station includes:
the third RI, the third PMI, and the third CQI; or
the third RI, the third PMI, and a difference between the third CQI and the first CQI; or
the third RI, the third PMI, and a difference between the third CQI and the second CQI; or the third RI, the third PMI, the third CQI, and the fourth CQI; or
the third RI, the third PMI, the third CQI, and a difference between the fourth CQI and the first CQI; or
the third RI, the third PMI, the third CQI, and a difference between the fourth CQI and the third CQI; or
the third RI, the third PMI, and the fourth CQI; or
the third RI, the third PMI, and a difference between the fourth CQI and the first CQI; or
the third RI, the third PMI, and a difference between the fourth CQI and the second CQI; or
the third RI, the third PMI, and a difference between the fourth CQI and the third CQI; or
the third RI, the third PMI, the fourth PMI, the third CQI, and the fourth CQI; or
the third RI, the third PMI, the fourth PMI, the third CQI, and a difference between the fourth CQI and the first CQI; or
the third RI, the third PMI, the fourth PMI, the third CQI, and a difference between the fourth CQI and the second CQI; or
the third RI, the third PMI, the fourth PMI, the third CQI, and a difference between the fourth CQI and the third CQI; or
the third RI, the third PMI, the fourth PMI, and the fourth CQI; or
the third RI, the third PMI, the fourth PMI, and a difference between the fourth CQI and the first CQI; or
the third RI, the third PMI, the fourth PMI, and a difference between the fourth CQI and the second CQI; or
the third RI, the third PMI, the fourth PMI, and a difference between the fourth CQI and the third CQI; or
the third PMI and the third CQI; or
the third PMI and a difference between the third CQI and the first CQI; or
the third PMI and a difference between the third CQI and the second CQI; or the third RI, the third PMI, the third CQI, and the fourth CQI; or
the third PMI, the third CQI, and a difference between the fourth CQI and the first CQI; or
the third PMI, the third CQI, and a difference between the fourth CQI and the third CQI; or
the third PMI and the fourth CQI; or
the third PMI and a difference between the fourth CQI and the first CQI; or
the third PMI and a difference between the fourth CQI and the second CQI; or
the third PMI and a difference between the fourth CQI and the third CQI; or
the third PMI, the fourth PMI, the third CQI, and the fourth CQI; or
the third PMI, the fourth PMI, the third CQI, and a difference between the fourth CQI and the first CQI; or
the third PMI, the fourth PMI, the third CQI, and a difference between the fourth CQI and the second CQI; or
the third PMI, the fourth PMI, the third CQI, and a difference between the fourth CQI and the third CQI; or
the third PMI, the fourth PMI, and the fourth CQI; or
the third PMI, the fourth PMI, and a difference between the fourth CQI and the first CQI; or
the third PMI, the fourth PMI, and a difference between the fourth CQI and the second CQI; or
the third PMI, the fourth PMI, and a difference between the fourth CQI and the third CQI.

The third CSI further includes:
when the precoding matrix W(1) corresponding to the first PMI is of a dual-codebook structure, that is, W(1)=W1(1)×W2(1), the fourth PMI corresponding to W2(1); or
when the precoding matrix W(3) corresponding to the third PMI is of a dual-codebook structure, that is, W(3)=W1(3)×W2(3), the third PMI corresponding to W2(3); or
when the precoding matrix W(2) corresponding to the second PMI is of a dual-codebook structure, that is, W(2)=W1(2)×W2(2), and the precoding matrix W(3) corresponding to the third PMI is of a dual-codebook structure, that is, W(3)=W1(3)×W2(3),
the precoding matrix corresponding to the fourth PMI being a matrix obtained by making a Kronecker product of W2(2) and W2(3) or being a matrix obtained by performing column selection on a matrix obtained by making a Kronecker product of W2(2) and W2(3); or
when the precoding matrix W(2) corresponding to the second PMI is of a dual-codebook structure, that is, W(2)=W1(2)×W2(2), and
the precoding matrix W(3) corresponding to the third PMI is of a dual-codebook structure, that is, W(3)=W1(3)×W2(3),
the precoding matrix corresponding to the fourth PMI being a matrix obtained by making a Kronecker product of W1(2) and W1(3) or being a matrix obtained by performing column selection on a matrix obtained by making a Kronecker product of W1(2) and W1(3).

Each piece of CSI includes one or more of the following information: a rank indication (RI), a precoding matrix indicator (PMI), a precoding type indicator (PTI), a channel quality indicator (CQI), an interference indication, and a switching flag of a restrictive CSI measurement range.

Each piece of measurement configuration information configured by the base station includes one or more of the following information: a pattern of a channel measurement reference pilot, a port quantity of the channel measurement reference pilot, power information of the channel measurement reference pilot, a pattern of an interference measurement reference resource, and information about the interference measurement reference resource.

A pattern of a first channel measurement reference pilot in the first measurement configuration information, a pattern of a second channel measurement reference pilot in the second measurement configuration information, and a pattern of a third channel measurement reference pilot in the third measurement configuration information meet that:

the pattern of the second channel measurement reference pilot is a subset of the pattern of the first channel measurement reference pilot; and the pattern of the third channel measurement reference pilot is a subset of the pattern of the first channel measurement reference pilot.

A port of a first channel measurement reference pilot in the first measurement configuration information, a port of a second channel measurement reference pilot in the second measurement configuration information, and a port of a third channel measurement reference pilot in the third measurement configuration information meet that:

a port quantity of the first channel measurement reference pilot is a product of a port quantity of the second channel measurement reference pilot and a port quantity of the third channel measurement reference pilot.

The port quantity of the second channel measurement reference pilot is greater than or equal to the port quantity of the third channel measurement reference pilot.

A rank in the second channel information is greater than or equal to a rank in the third channel information.

A sending period of the first channel measurement reference pilot is an integer multiple of a sending period of the channel measurement reference pilot, and the sending period of the first channel measurement reference pilot is an integer multiple of a sending period of the third channel measurement reference pilot.

Measurement on the first channel, measurement on the second channel, and measurement on the third channel respectively correspond to a first CSI process, a second CSI process, and a third CSI process, where an RI reporting period configured for the first CSI process is a first integer multiple of an RI reporting period configured for the second CSI process, and the RI reporting period configured for the first CSI process is a first integer multiple of an RI reporting period configured for the third CSI process;

a PMI reporting period configured for the first CSI process is a second integer multiple of a PMI reporting period configured for the second CSI process, and the PMI reporting period configured for the first CSI process is a second integer multiple of a PMI reporting period configured for the third CSI process; and a CQI reporting period configured for the first CSI process is a third integer multiple of a reporting CQI period configured for the second CSI process, and the CQI reporting period configured for the first CSI process is a third integer multiple of a reporting CQI period configured for the third CSI process.

Numbers of bundled CSI processes, in which a restrictive CSI measurement range is used, are configured by using upper layer signaling or dynamic signaling of the base station.

The base station receives a CSI measurement flag indicating that a restrictive CSI measurement range needs to be used, which is reported by the terminal.

The base station first receives CSI information obtained when no restrictive CSI measurement range is used, then, receives a restrictive measurement flag indicating that a restrictive CSI measurement range needs to be used, and then, receives CSI information obtained when the restrictive CSI measurement range is used.

The base station first receives CSI information obtained when a first restrictive CSI measurement range is used, then, receives a restrictive measurement flag indicating that a second restrictive CSI measurement range needs to be used, and then, receives CSI information obtained when the second restrictive CSI measurement range is used.

The base station first receives CSI information obtained when no restrictive CSI measurement range is used, then, the base station notifies, by using upper layer signaling or dynamic signaling, a restrictive measurement flag indicating that a restrictive CSI measurement range needs to be used, and then, the base station receives CSI information obtained when the restrictive CSI measurement range is used, which is reported by UE.

The base station first receives CSI information obtained when a first restrictive CSI measurement range is used, then, the base station notifies, by using upper layer signaling or dynamic signaling, a restrictive measurement flag indicating that a second restrictive CSI measurement range needs to be used, and then, the base station receives CSI information obtained when the second restrictive CSI measurement range is used, which is reported by UE.

Restricting a CSI measurement range includes: restricting an RI measurement range, or restricting an antenna port quantity of a reported PMI.

Figure 22:
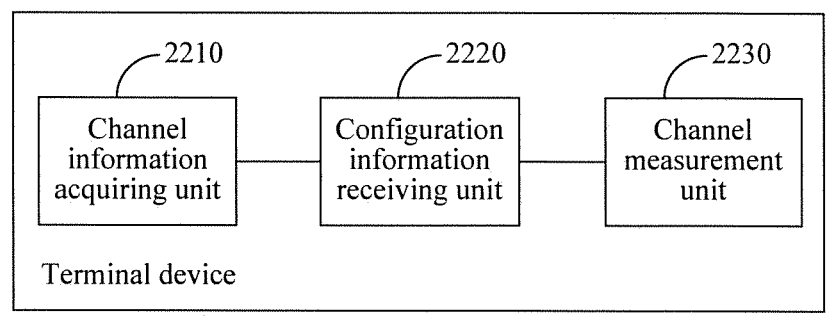
FIG. 22 is a schematic structural diagram of a terminal device according to an embodiment of the present invention.

A terminal device in an embodiment of the present invention is shown in FIG. 22, and includes:

a channel information acquiring unit 2210, configured to acquire first channel information, where the first channel information includes one or more of the following information: first channel state information (CSI) of a first channel, and first measurement configuration information used for measuring the first channel;

a configuration information receiving unit 2220, configured to receive second measurement configuration information sent by a base station and used for measuring a second channel; and a channel measurement unit 2230, configured to measure the second channel according to the first channel information and the second measurement configuration information, to obtain second CSI.

Figure 23:
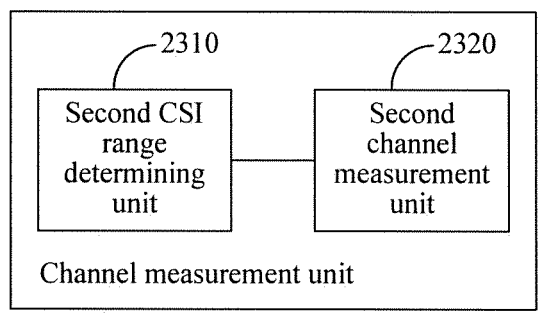
FIG. 23 is a schematic structural diagram of a channel measurement unit in the terminal device in FIG. 22.

As shown in FIG. 23, in this embodiment, the channel measurement unit 2230 specifically includes:

a second CSI range determining unit 2310, configured to determine, according to the first channel information, a second CSI range for measuring the second channel; and a second channel measurement unit 2320, configured to measure, according to the second measurement configuration information, the second channel in the second CSI range for measuring the second channel.

The second CSI range determining unit 2310 may be configured to determine, according to the first CSI in the first channel information, the second CSI range for measuring the second channel; and specifically configured to determine a range of a second RI in the second CSI according to a first RI in the first CSI. The first CSI is information configured by the base station, or is information that is measured and reported by the terminal according to the first measurement configuration information. The range of the second RI≤the first RI; or the range of the second RI<the first RI.

In the terminal device in this embodiment, the configuration information receiving unit 2220 is further configured to receive third measurement configuration information used for measuring a third channel. The channel measurement unit 2230 is further configured to measure the third channel according to at least one of the first channel information and second channel information and according to the third measurement configuration information, to obtain third CSI. The second channel information includes the second CSI obtained by measuring the second channel, or configured CSI that is configured by the base station.

Figure 24:
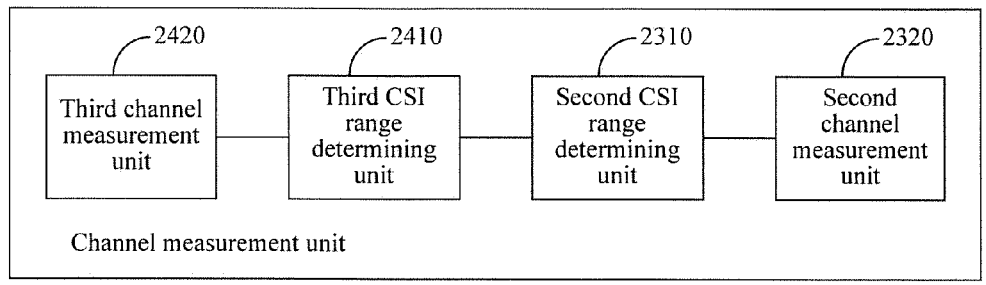
FIG. 24 is another schematic structural diagram of the channel measurement unit in the terminal device in FIG. 22.

As shown in FIG. 24, the channel measurement unit 2230 further includes:

a third CSI range determining unit 2410, configured to determine, according to at least one of the first channel information and the second channel information, a CSI range for measuring the third channel, where the third CSI range determining unit 2410 is specifically configured to determine, according to at least one of the first CSI and the second CSI, the CSI range for measuring the third channel; or determine, according to at least one of the first CSI and CSI configured in the second channel information, the CSI range for measuring the third channel; and a third channel measurement unit 2420, configured to measure, according to the third measurement configuration information, the third channel in the CSI range for measuring the third channel.

More specifically, the third CSI range determining unit 2410 is specifically configured to determine a range of a third RI in the third CSI according to at least one of the first RI in the first CSI and the second RI in the second CSI; or determine a range of a third RI in the third CSI according to at least one of the first RI in the first CSI and a configured RI in the second channel information. A manner of determining the range of the third RI is fixed, or is notified by using upper layer signaling or dynamic signaling of the base station.

In this embodiment, the range of the third RI includes:

the third RI≤the first RI, or the third RI<the first RI; or a value obtained by rounding a quotient of the first RI and the second RI≤the third RI≤the first RI, or a value obtained by rounding a quotient of the first RI and the second RI<the third RI≤the first RI, or a value obtained by rounding a quotient of the first RI and the second RI≤the third RI<the first RI, or a value obtained by rounding a quotient of the first RI and the second RI<the third RI<the first RI, where the rounding is rounding up or rounding down; or a value obtained by rounding a quotient of the first RI and the configured RI in the second channel information≤the third RI≤the first RI, or a value obtained by rounding a quotient of the first RI and the configured RI in the second channel information<the third RI≤the first RI, or a value obtained by rounding a quotient of the first RI and the configured RI in the second channel information≤the third RI<the first RI, or a value obtained by rounding a quotient of the first RI and the configured RI in the second channel information<the third RI<the first RI, where the rounding is rounding up or rounding down; or the third RI≤a value obtained by rounding a quotient of the first RI and the second RI, or the third RI<a value obtained by rounding a quotient of the first RI and the second RI, where the rounding is rounding up or rounding down; or the third RI≤a value obtained by rounding a quotient of the first RI and the configured RI in the second channel information, or the third RI<a value obtained by rounding a quotient of the first RI and the configured RI in the second channel information, where the rounding is rounding up or rounding down; or the third RI=a value obtained by rounding a quotient of the first RI and the second RI, where the rounding is rounding up or rounding down; or the third RI=a value obtained by rounding a quotient of the first RI and the configured RI in the second channel information, where the rounding may be rounding up or rounding down.

In this embodiment, the third channel measurement unit 2420 includes:

a PMI determining unit, configured to determine a PMI in the third CSI, where the PMI in the third CSI includes a third PMI and/or a fourth PMI, where the PMI determining unit is specifically configured to: determine the third PMI according to the third measurement configuration information and the third RI, where a port quantity of the third PMI is a port quantity of a pilot in the third measurement configuration information, and an RI is the third RI; or determine the fourth PMI according to the first channel information, where a port quantity of the fourth PMI is a port quantity of a pilot in the first measurement configuration information, and an RI is the first RI; or determine the fourth PMI according to the first channel information and the second channel information, where a port quantity of the fourth PMI is a port quantity of a pilot in the first measurement configuration information, and an RI is the second RI; or determine the fourth PMI according to the first channel information and third channel information, where a port quantity of the fourth PMI is a port quantity of a pilot in the first measurement configuration information, and an RI is the third RI; or determine the fourth PMI according to the second channel information and the third channel information, where a port quantity of the fourth PMI is a product of a port quantity of a pilot in the second measurement configuration information and a port quantity of a pilot in the third measurement configuration information, and an RI is a product of the second RI and the third RI, or is min(the first RI, a product of the second RI and the third RI); or determine the fourth PMI according to the first channel information, the second channel information, and the third channel information, where a port quantity of the fourth PMI is a port quantity of a pilot in the first measurement configuration information, and an RI is a product of the second RI and the third RI, or is min(the first RI, a product of the second RI and the third RI), where min is an operation of obtaining a minimum value.

A precoding matrix corresponding to the fourth PMI is a Kronecker product of a precoding matrix corresponding to a second PMI and a precoding matrix corresponding to the third PMI; or a precoding matrix corresponding to the fourth PMI is a matrix obtained by performing column selection on a Kronecker product of a precoding matrix corresponding to a second PMI and a precoding matrix corresponding to the third PMI, which may specifically be:

X columns in the Kronecker product of the precoding matrix corresponding to the second PMI and the precoding matrix corresponding to the third PMI; or X columns in a Kronecker product of the precoding matrix corresponding to the third PMI and the precoding matrix corresponding to the second PMI.

In this embodiment, the third channel measurement unit 2420 further includes: a CQI determining unit, configured to determine a third CQI according to the third PMI; or determine a fourth CQI according to the fourth PMI.

Figure 25:
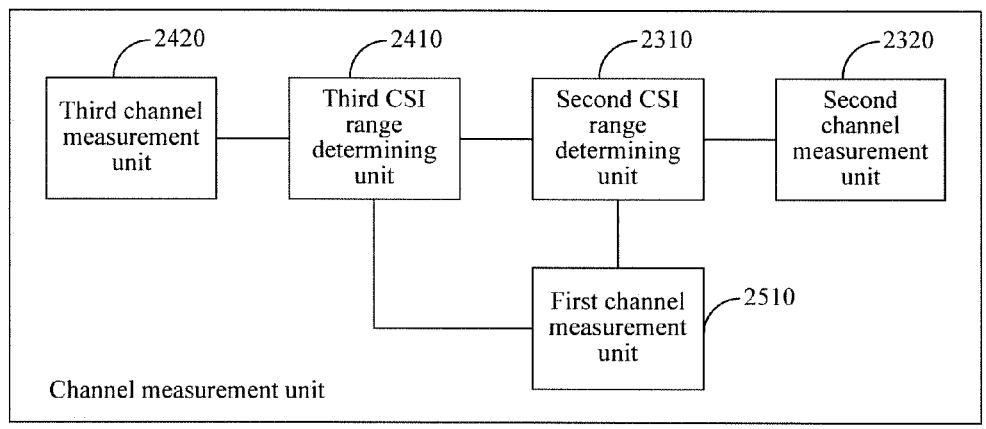
FIG. 25 is still another schematic structural diagram of the channel measurement unit in the terminal device in FIG. 22.

As shown in FIG. 25, in this embodiment, the channel measurement unit 2230 further includes:

a first channel measurement unit 2510, configured to measure the first channel, and specifically configured to:

determine a first CQI based on a transmit diversity manner according to the first measurement configuration information; or determine a first CQI based on an open-loop spatial multiplexing manner according to the first measurement configuration information; or determine a first CQI based on the first PMI according to the first measurement configuration information; or determine a first CQI based on the first PMI with a fixed RI according to the first measurement configuration information.

Figure 26:
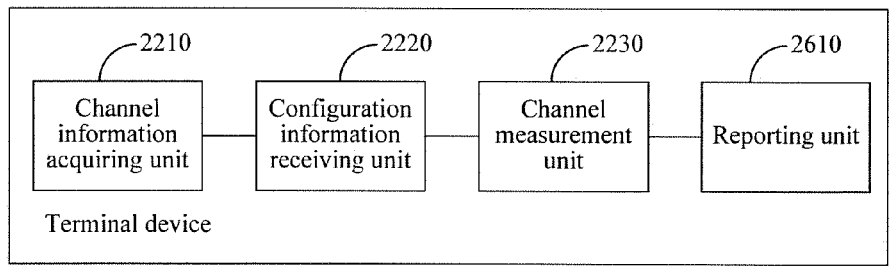
FIG. 26 is a schematic structural diagram of another terminal device according to an embodiment of the present invention.

As shown in FIG. 26, the terminal device in this embodiment further includes: a reporting unit 2610. The reporting unit 2610 includes: a first channel reporting unit, configured to report the first CSI in the first channel, where the first CSI includes:

the first RI; or
the first RI and the first CQI; or
the first RI and the first PMI; or
the first RI, the first PMI, and the first CQI; or
the first RI and the first sub PMI; or
the first RI, the first sub PMI, and the first CQI; or
the first RI and the second PMI; or
the first RI, the second PMI, and the second CQI; or
the first RI and the third PMI; or
the first RI, the third PMI, and the third CQI; or
the first RI and the second sub PMI; or
the first RI, the second sub PMI, and the second CQI; or
the first RI and the third sub PMI; or
the first RI, the third sub PMI, and the third CQI.

When the first channel reporting unit reports the first sub PMI, when a precoding matrix W(1) corresponding to the first PMI is of a dual-codebook structure, that is, W(1)=W1(1)×W2(1), a precoding matrix corresponding to a first sub PMI is W1(1).

When the first channel reporting unit reports the second sub PMI, precoding indicator information corresponding to W(2) that is reported according to the port corresponding to the second CSI-RS pattern is the second PMI.

When the first channel reporting unit reports the third sub PMI, a location of a port corresponding to the second CSI-RS pattern is indicated in the first CSI-RS pattern, and precoding indicator information corresponding to W1(2) of long-term wideband that is reported according to the port corresponding to the second CSI-RS pattern is the second sub PMI, where W(2)=W1 (2)×W2(2).

When the first channel reporting unit reports the third sub PMI: a location of a port corresponding to the third CSI-RS pattern is indicated in the first CSI-RS pattern, and precoding indicator information corresponding to W1(3) of long-term wideband that is reported according to the port corresponding to the third CSI-RS pattern is the third sub PMI, where W(3)=W1(3)×W2(3).

When reporting the second sub PMI, the first channel reporting unit is specifically configured to: when the precoding matrix W(2) corresponding to the second PMI is of a dual-codebook structure, that is, W(2)=W1(2)×W2(2), and the precoding matrix W(3) corresponding to the third PMI is of a dual-codebook structure, that is, W(3)=W1(3)×W2(3), report the second PMI corresponding to W1(2), the third PMI corresponding to W1(3), and the first RI.

The reporting unit 2610 further includes: a third channel reporting unit, configured to report the third CSI of the third channel, where the third CSI includes:

the third RI, the third PMI, and the third CQI; or
the third RI, the third PMI, and a difference between the third CQI and the first CQI; or
the third RI, the third PMI, and a difference between the third CQI and the second CQI; or the third RI, the third PMI, the third CQI, and the fourth CQI; or
the third RI, the third PMI, the third CQI, and a difference between the fourth CQI and the first CQI; or
the third RI, the third PMI, the third CQI, and a difference between the fourth CQI and the third CQI; or
the third RI, the third PMI, and the fourth CQI; or
the third RI, the third PMI, and a difference between the fourth CQI and the first CQI; or
the third RI, the third PMI, and a difference between the fourth CQI and the second CQI; or
the third RI, the third PMI, and a difference between the fourth CQI and the third CQI; or
the third RI, the third PMI, the fourth PMI, the third CQI, and the fourth CQI; or
the third RI, the third PMI, the fourth PMI, the third CQI, and a difference between the fourth CQI and the first CQI; or
the third RI, the third PMI, the fourth PMI, the third CQI, and a difference between the fourth CQI and the second CQI; or
the third RI, the third PMI, the fourth PMI, the third CQI, and a difference between the fourth CQI and the third CQI; or
the third RI, the third PMI, the fourth PMI, and the fourth CQI; or
the third RI, the third PMI, the fourth PMI, and a difference between the fourth CQI and the first CQI; or
the third RI, the third PMI, the fourth PMI, and a difference between the fourth CQI and the second CQI; or
the third RI, the third PMI, the fourth PMI, and a difference between the fourth CQI and the third CQI; or
the third PMI and the third CQI; or
the third PMI and a difference between the third CQI and the first CQI; or
the third PMI and a difference between the third CQI and the second CQI; or the third RI, the third PMI, the third CQI, and the fourth CQI; or
the third PMI, the third CQI, and a difference between the fourth CQI and the first CQI; or
the third PMI, the third CQI, and a difference between the fourth CQI and the third CQI; or
the third PMI and the fourth CQI; or
the third PMI and a difference between the fourth CQI and the first CQI; or
the third PMI and a difference between the fourth CQI and the second CQI; or
the third PMI and a difference between the fourth CQI and the third CQI; or
the third PMI, the fourth PMI, the third CQI, and the fourth CQI; or
the third PMI, the fourth PMI, the third CQI, and a difference between the fourth CQI and the first CQI; or
the third PMI, the fourth PMI, the third CQI, and a difference between the fourth CQI and the second CQI; or the third PMI, the fourth PMI, the third CQI, and a difference between the fourth CQI and the third CQI; or the third PMI, the fourth PMI, and the fourth CQI; or the third PMI, the fourth PMI, and a difference between the fourth CQI and the first CQI; or the third PMI, the fourth PMI, and a difference between the fourth CQI and the second CQI; or the third PMI, the fourth PMI, and a difference between the fourth CQI and the third CQI.

The third channel reporting unit is specifically configured to: when the precoding matrix W(1) corresponding to the first PMI is of a dual-codebook structure, that is, W(1)=W1(1)×W2(1), report the fourth PMI corresponding to W2(1); or when the precoding matrix W(3) corresponding to the third PMI is of a dual-codebook structure, that is, W(3)=W1(3)×W2(3), report the third PMI corresponding to W2(3); or when the precoding matrix W(2) corresponding to the second PMI is of a dual-codebook structure, that is, W(2)=W1(2)×W2(2), and the precoding matrix W(3) corresponding to the third PMI is of a dual-codebook structure, that is, W(3)=W1(3)×W2(3), report the fourth PMI, where the precoding matrix corresponding to the fourth PMI is a matrix obtained by making a Kronecker product of W2(2) and W2(3) or is a matrix obtained by performing column selection on a matrix obtained by making a Kronecker product of W2(2) and W2(3); or when the precoding matrix W(2) corresponding to the second PMI is of a dual-codebook structure, that is, W(2)=W1(2)×W2(2), and the precoding matrix W(3) corresponding to the third PMI is of a dual-codebook structure, that is, W(3)=W1(3)×W2(3), report the fourth PMI, where the precoding matrix corresponding to the fourth PMI is a matrix obtained by making a Kronecker product of W1(2) and W1(3) or is a matrix obtained by performing column selection on a matrix obtained by making a Kronecker product of W1(2) and W1(3).

In this embodiment, each piece of CSI includes one or more of the following information: a rank indication (RI), a precoding matrix indicator (PMI), a precoding type indicator (PTI), a channel quality indicator (CQI), an interference indication, and a switching flag of a restrictive CSI measurement range.

Each piece of measurement configuration information includes one or more of the following information: a pattern of a channel measurement reference pilot, a port quantity of the channel measurement reference pilot, power information of the channel measurement reference pilot, a pattern of an interference measurement reference resource, and information about the interference measurement reference resource.

A pattern of a first channel measurement reference pilot in the first measurement configuration information, a pattern of a second channel measurement reference pilot in the second measurement configuration information, and a pattern of a third channel measurement reference pilot in the third measurement configuration information meet that:

the pattern of the second channel measurement reference pilot is a subset of the pattern of the first channel measurement reference pilot; and the pattern of the third channel measurement reference pilot is a subset of the pattern of the first channel measurement reference pilot.

A port of a first channel measurement reference pilot in the first measurement configuration information, a port of a second channel measurement reference pilot in the second measurement configuration information, and a port of a third channel measurement reference pilot in the third measurement configuration information meet that:

a port quantity of the first channel measurement reference pilot is a product of a port quantity of the second channel measurement reference pilot and a port quantity of the third channel measurement reference pilot.

The port quantity of the second channel measurement reference pilot is greater than or equal to the port quantity of the third channel measurement reference pilot.

A rank in the second channel information is greater than or equal to a rank in the third channel information.

In this embodiment, a sending period of the first channel measurement reference pilot is an integer multiple of a sending period of the channel measurement reference pilot, and the sending period of the first channel measurement reference pilot is an integer multiple of a sending period of the third channel measurement reference pilot.

The first channel information includes the first CSI, and the acquiring, by a terminal, first channel information includes:

receiving, by the terminal, the first measurement configuration information sent by the base station; and measuring the first channel according to the first measurement configuration information, to obtain the first CSI.

Measurement on the first channel, measurement on the second channel, and measurement on the third channel respectively correspond to a first CSI process, a second CSI process, and a third CSI process.

In this embodiment, in a reporting procedure for the first, the second, and the third CSI processes, a period of reporting an RI for the first CSI process is a first integer multiple of a period of reporting an RI for the second CSI process, and the period of reporting the RI for the first CSI process is a first integer multiple of a period of reporting an RI for the third CSI process;

a period of reporting a PMI for the first CSI process is a second integer multiple of a period of reporting a PMI for the second CSI process, and the period of reporting the PMI for the first CSI process is a second integer multiple of a period of reporting a PMI for the third CSI process; and a period of reporting a CQI for the first CSI process is a third integer multiple of a period of reporting a CQI for the second CSI process, and the period of reporting the CQI for the first CSI process is a third integer multiple of a period of reporting a CQI for the third CSI process.

Numbers of bundled CSI processes, in which the terminal device in this embodiment uses a restrictive CSI measurement range, are configured by using upper layer signaling or dynamic signaling of the base station.

The reporting unit 2610 is further configured to report a CSI measurement flag indicating whether to use a restrictive CSI measurement range.

The reporting unit 2610 is further configured to first report CSI information obtained when no restrictive CSI measurement range is used, then, report a restrictive measurement flag indicating that a restrictive CSI measurement range needs to be used, and then, report CSI information obtained when the restrictive CSI measurement range is used.

The reporting unit 2610 is further configured to first report CSI information obtained when a first restrictive CSI measurement range is used, then, report a restrictive measurement flag indicating that a second restrictive CSI measurement range needs to be used, and then, report CSI information obtained when the second restrictive CSI measurement range is used.

The reporting unit 2610 is further configured to first report CSI information obtained when no restrictive CSI measurement range is used, and then, receive a restrictive measurement flag indicating that a restrictive CSI measurement range needs to be used, which is notified by the base station by using upper layer signaling or dynamic signaling, and then, report, by UE, CSI information obtained when the restrictive CSI measurement range is used.

The reporting unit 2610 is further configured to first report CSI information obtained when a first restrictive CSI measurement range is used, and then, receives a restrictive measurement flag indicating that a second restrictive CSI measurement range needs to be used, which is notified by the base station by using upper layer signaling or dynamic signaling, and then, report, by UE, CSI information obtained when the second restrictive CSI measurement range is used.

Restricting a CSI measurement range includes: restricting an RI measurement range, or restricting an antenna port quantity of a reported PMI.

A base station in an embodiment of the present invention includes:

a second CSI acquiring unit, configured to acquire second CSI, where the second CSI is associated with first channel information, and the first channel information includes one or more of the following information: reported first channel state information (CSI) of a first channel, first channel state information (CSI) of the first channel that is configured by the base station, and first measurement configuration information used for measuring the first channel.

That the second CSI is associated with first channel information includes: a second RI in the second CSI is associated with a first RI in the first CSI.

That a second RI in the second CSI is associated with a first RI in the first CSI includes: the second RI≤the first RI; or the second RI<the first RI.

The base station further includes: a third CSI acquiring unit, configured to acquire third CSI, where the third CSI is associated with at least one of the first CSI and the second CSI.

That the third CSI is associated with at least one of the first CSI and the second CSI includes:

a third RI in the third CSI is associated with at least one of the first RI in the first CSI and the second RI in the second CSI; or a third RI in the third CSI is associated with at least one of the first RI in the first CSI and a configured RI in second channel information.

A manner of determining a measurement range of the second RI in the second CSI is notified by using upper layer signaling or dynamic signaling of the base station.

A manner of determining a measurement range of the third RI in the third CSI is notified by using upper layer signaling or dynamic signaling of the base station.

The range of the third RI includes:

the third RI≤the first RI, or the third RI<the first RI; or a value obtained by rounding a quotient of the first RI and the second RI≤the third RI≤the first RI, or a value obtained by rounding a quotient of the first RI and the second RI<the third RI≤the first RI, or a value obtained by rounding a quotient of the first RI and the second RI≤the third RI<the first RI, or a value obtained by rounding a quotient of the first RI and the second RI<the third RI<the first RI, where the rounding is rounding up or rounding down; or a value obtained by rounding a quotient of the first RI and the configured RI in the second channel information≤the third RI≤the first RI, or a value obtained by rounding a quotient of the first RI and the configured RI in the second channel information<the third RI≤the first RI, or a value obtained by rounding a quotient of the first RI and the configured RI in the second channel information≤the third RI<the first RI, or a value obtained by rounding a quotient of the first RI and the configured RI in the second channel information<the third RI<the first RI, where the rounding is rounding up or rounding down; or the third RI≤a value obtained by rounding a quotient of the first RI and the second RI, or the third RI<a value obtained by rounding a quotient of the first RI and the second RI, where the rounding is rounding up or rounding down; or the third RI≤a value obtained by rounding a quotient of the first RI and the configured RI, or the third RI<a value obtained by rounding a quotient of the first RI and the configured RI, where the rounding is rounding up or rounding down; or the third RI=a value obtained by rounding a quotient of the first RI and the second RI, where the rounding is rounding up or rounding down; or the third RI=a value obtained by rounding a quotient of the first RI and the configured RI in the second channel information, where the rounding may be rounding up or rounding down.

The third CSI obtained by the third CSI acquiring unit includes a third PMI and/or a fourth PMI, where a port quantity of the third PMI is a port quantity of a pilot in the third measurement configuration information, and an RI of the third PMI is the third RI; or a port quantity of the fourth PMI is a port quantity of a pilot in the first measurement configuration information, and an RI of the fourth PMI is the first RI; or a port quantity of the fourth PMI is a port quantity of a pilot in the first measurement configuration information, and an RI of the fourth PMI is the second RI; or a port quantity of the fourth PMI is a port quantity of a pilot in the first measurement configuration information, and an RI of the fourth PMI is the third RI; or a port quantity of the fourth PMI is a product of a port quantity of a pilot in the second measurement configuration information and a port quantity of a pilot in the third measurement configuration information, and an RI of the fourth PMI is a product of the second RI and the third RI, or is min(the first RI, a product of the second RI and the third RI); or a port quantity of the fourth PMI is a port quantity of a pilot in the first measurement configuration information, and an RI of the fourth PMI is a product of the second RI and the third RI, or is min(the first RI, a product of the second RI and the third RI), where min is an operation of obtaining a minimum value.

A precoding matrix corresponding to the fourth PMI is a Kronecker product of a precoding matrix corresponding to a second PMI and a precoding matrix corresponding to the third PMI; or a precoding matrix corresponding to the fourth PMI is a matrix obtained by performing column selection on a Kronecker product of a precoding matrix corresponding to a second PMI and a precoding matrix corresponding to the third PMI.

The second PMI is a PMI, of which a port quantity is a port quantity of a pilot in the second measurement configuration information, in the second CSI, and the third PMI is a PMI, of which a port quantity is a port quantity of a pilot in the third measurement configuration information, in the third CSI.

The precoding matrix corresponding to the fourth PMI is:

X columns in the Kronecker product of the precoding matrix corresponding to the second PMI and the precoding matrix corresponding to the third PMI; or X columns in a Kronecker product of the precoding matrix corresponding to the third PMI and the precoding matrix corresponding to the second PMI.

The third CSI further includes:

a third CQI determined according to the third PMI; or a fourth CQI determined according to the fourth PMI.

The first CSI includes:

a first PMI, where when a precoding matrix W(1) corresponding to the first PMI is of a dual-codebook structure, that is, W(1)=W1(1)×W2(1), a precoding matrix corresponding to a first sub PMI is W1(1); or the second PMI, where the second PMI is precoding indicator information corresponding to W(2) that is reported according to a port corresponding to a second CSI-RS pattern, the base station indicates, in a first CSI-RS pattern, a location of the port corresponding to the second CSI-RS pattern, and a second sub PMI received by the base station is precoding indicator information corresponding to W1(2) of long-term wideband that is reported according to the port corresponding to the second CSI-RS pattern, where W(2)=W1(2)×W2(2); and the third sub PMI, where the base station indicates a location of a port corresponding to a third CSI-RS pattern in the first CSI-RS pattern, and the third sub PMI received by the base station is precoding indicator information corresponding to W1(3) of long-term wideband that is reported according to the port corresponding to the third CSI-RS pattern, where W(3)=W1(3)×W2(3); and the first CSI includes:

when the precoding matrix W(2) corresponding to the second PMI is of a dual-codebook structure, that is, W(2)=W1(2)×W2(2), and the precoding matrix W(3) corresponding to the third PMI is of a dual-codebook structure, that is, W(3)=W1(3)×W2(3), the second PMI corresponding to W1(2), the third PMI corresponding to W1(3), and the first RI.

The first CQI in the first CSI includes:

a first CQI determined based on a transmit diversity manner; or a first CQI determined based on an open-loop spatial multiplexing manner; or a first CQI determined based on the first PMI; or a first CQI determined based on the first PMI with a fixed RI; or a first CQI determined according to the first PMI; or a first CQI determined according to the first sub PMI; or a second CQI determined according to the second PMI; or a second CQI determined according to the second sub PMI; or a third CQI determined according to the third PMI; or a third CQI determined according to the third sub PMI.

The first CSI includes:

the first RI; or the first RI and the first CQI; or the first RI and the first PMI; or the first RI, the first PMI, and the first CQI; or the first RI and the first sub PMI; or the first RI, the first sub PMI, and the first CQI; or the first RI and the second PMI; or the first RI, the second PMI, and the second CQI; or the first RI and the third PMI; or the first RI, the third PMI, and the third CQI; or the first RI and the second sub PMI; or the first RI, the second sub PMI, and the second CQI; or the first RI and the third sub PMI; or the first RI, the third sub PMI, and the third CQI.

The third CSI includes:

the third RI, the third PMI, and the third CQI; or the third RI, the third PMI, and a difference between the third CQI and the first CQI; or the third RI, the third PMI, and a difference between the third CQI and the second CQI; or the third RI, the third PMI, the third CQI, and the fourth CQI; or the third RI, the third PMI, the third CQI, and a difference between the fourth CQI and the first CQI; or the third RI, the third PMI, the third CQI, and a difference between the fourth CQI and the third CQI; or the third RI, the third PMI, and the fourth CQI; or the third RI, the third PMI, and a difference between the fourth CQI and the first CQI; or the third RI, the third PMI, and a difference between the fourth CQI and the second CQI; or the third RI, the third PMI, and a difference between the fourth CQI and the third CQI; or the third RI, the third PMI, the fourth PMI, the third CQI, and the fourth CQI; or the third RI, the third PMI, the fourth PMI, the third CQI, and a difference between the fourth CQI and the first CQI; or the third RI, the third PMI, the fourth PMI, the third CQI, and a difference between the fourth CQI and the second CQI; or the third RI, the third PMI, the fourth PMI, the third CQI, and a difference between the fourth CQI and the third CQI; or the third RI, the third PMI, the fourth PMI, and the fourth CQI; or the third RI, the third PMI, the fourth PMI, and a difference between the fourth CQI and the first CQI; or the third RI, the third PMI, the fourth PMI, and a difference between the fourth CQI and the second CQI; or the third RI, the third PMI, the fourth PMI, and a difference between the fourth CQI and the third CQI; or the third PMI and the third CQI; or the third PMI and a difference between the third CQI and the first CQI; or the third PMI and a difference between the third CQI and the second CQI; or the third RI, the third PMI, the third CQI, and the fourth CQI; or the third PMI, the third CQI, and a difference between the fourth CQI and the first CQI; or the third PMI, the third CQI, and a difference between the fourth CQI and the third CQI; or the third PMI and the fourth CQI; or the third PMI and a difference between the fourth CQI and the first CQI; or the third PMI and a difference between the fourth CQI and the second CQI; or the third PMI and a difference between the fourth CQI and the third CQI; or the third PMI, the fourth PMI, the third CQI, and the fourth CQI; or the third PMI, the fourth PMI, the third CQI, and a difference between the fourth CQI and the first CQI; or the third PMI, the fourth PMI, the third CQI, and a difference between the fourth CQI and the second CQI; or the third PMI, the fourth PMI, the third CQI, and a difference between the fourth CQI and the third CQI; or the third PMI, the fourth PMI, and the fourth CQI; or the third PMI, the fourth PMI, and a difference between the fourth CQI and the first CQI; or the third PMI, the fourth PMI, and a difference between the fourth CQI and the second CQI; or the third PMI, the fourth PMI, and a difference between the fourth CQI and the third CQI.

The third CSI further includes:

when the precoding matrix W(1) corresponding to the first PMI is of a dual-codebook structure, that is, W(1)=W1(1)×W2(1), the fourth PMI corresponding to W2(1); or when the precoding matrix W(3) corresponding to the third PMI is of a dual-codebook structure, that is, W(3)=W1(3)×W2(3), the third PMI corresponding to W2(3); or when the precoding matrix W(2) corresponding to the second PMI is of a dual-codebook structure, that is, W(2)=W1(2)×W2(2), and the precoding matrix W(3) corresponding to the third PMI is of a dual-codebook structure, that is, W(3)=W1(3)×W2(3), the precoding matrix corresponding to the fourth PMI being a matrix obtained by making a Kronecker product of W2(2) and W2(3) or being a matrix obtained by performing column selection on a matrix obtained by making a Kronecker product of W2(2) and W2(3); or when the precoding matrix W(2) corresponding to the second PMI is of a dual-codebook structure, that is, W(2)=W1(2)×W2(2), and the precoding matrix W(3) corresponding to the third PMI is of a dual-codebook structure, that is, W(3)=W1(3)×W2(3), the precoding matrix corresponding to the fourth PMI being a matrix obtained by making a Kronecker product of W1(2) and W1(3) or being a matrix obtained by performing column selection on a matrix obtained by making a Kronecker product of W1(2) and W1(3).

Each piece of CSI includes one or more of the following information: a rank indication (RI), a precoding matrix indicator (PMI), a precoding type indicator (PTI), a channel quality indicator (CQI), an interference indication, and a switching flag of a restrictive CSI measurement range.

Each piece of measurement configuration information configured by the base station includes one or more of the following information: a pattern of a channel measurement reference pilot, a port quantity of the channel measurement reference pilot, power information of the channel measurement reference pilot, a pattern of an interference measurement reference resource, and information about the interference measurement reference resource.

A pattern of a first channel measurement reference pilot in the first measurement configuration infatuation, a pattern of a second channel measurement reference pilot in the second measurement configuration information, and a pattern of a third channel measurement reference pilot in the third measurement configuration information meet that:

the pattern of the second channel measurement reference pilot is a subset of the pattern of the first channel measurement reference pilot; and the pattern of the third channel measurement reference pilot is a subset of the pattern of the first channel measurement reference pilot.

A port of a first channel measurement reference pilot in the first measurement configuration information, a port of a second channel measurement reference pilot in the second measurement configuration information, and a port of a third channel measurement reference pilot in the third measurement configuration information meet that:

a port quantity of the first channel measurement reference pilot is a product of a port quantity of the second channel measurement reference pilot and a port quantity of the third channel measurement reference pilot.

The port quantity of the second channel measurement reference pilot is greater than or equal to the port quantity of the third channel measurement reference pilot.

A rank in the second channel information is greater than or equal to a rank in the third channel information.

A sending period of the first channel measurement reference pilot is an integer multiple of a sending period of the second channel measurement reference pilot, and the sending period of the first channel measurement reference pilot is an integer multiple of a sending period of the third channel measurement reference pilot.

Measurement on the first channel, measurement on the second channel, and measurement on the third channel respectively correspond to a first CSI process, a second CSI process, and a third CSI process.

An RI reporting period configured for the first CSI process is a first integer multiple of an RI reporting period configured for the second CSI process, and the RI reporting period configured for the first CSI process is a first integer multiple of an RI reporting period configured for the third CSI process;

a PMI reporting period configured for the first CSI process is a second integer multiple of a PMI reporting period configured for the second CSI process, and the PMI reporting period configured for the first CSI process is a second integer multiple of a PMI reporting period configured for the third CSI process; and a CQI reporting period configured for the first CSI process is a third integer multiple of a CQI reporting period configured for the second CSI process, and the CQI reporting period configured for the first CSI process is a third integer multiple of a CQI reporting period configured for the third CSI process.

Numbers of bundled CSI processes, in which a restrictive CSI measurement range is used, are configured by using upper layer signaling or dynamic signaling of the base station.

The base station receives a CSI measurement flag indicating that a restrictive CSI measurement range needs to be used, which is reported by the terminal.

The base station first receives CSI information obtained when no restrictive CSI measurement range is used, then, receives a restrictive measurement flag indicating that a restrictive CSI measurement range needs to be used, and then, receives CSI information obtained when the restrictive CSI measurement range is used.

The base station first receives CSI information obtained when a first restrictive CSI measurement range is used, then, receives a restrictive measurement flag indicating that a second restrictive CSI measurement range needs to be used, and then, receives CSI information obtained when the second restrictive CSI measurement range is used.

The base station first receives CSI information obtained when no restrictive CSI measurement range is used, then, the base station notifies, by using upper layer signaling or dynamic signaling, a restrictive measurement flag indicating that a restrictive CSI measurement range needs to be used, and then, the base station receives CSI information obtained when the restrictive CSI measurement range is used, which is reported by UE.

The base station first receives CSI information obtained when a first restrictive CSI measurement range is used, then, the base station notifies, by using upper layer signaling or dynamic signaling, a restrictive measurement flag indicating that a second restrictive CSI measurement range needs to be used, and then, the base station receives CSI information obtained when the second restrictive CSI measurement range is used, which is reported by UE.

Restricting a CSI measurement range includes: restricting an RI measurement range, or restricting an antenna port quantity of a reported PMI.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A channel measurement method, comprising:
   receiving, by a terminal from a base station, first measurement configuration information used for measuring a first channel;
   measuring, by the terminal, the first channel according to the first measurement configuration information, to obtain first channel state information (CSI), wherein the first CSI comprises a first rank indication (RI);
   reporting, by the terminal to the base station, the first CSI;
   receiving, by the terminal from the base station, second measurement configuration information used for measuring a second channel;
   determining, according to the first RI that is obtained by measuring and reported to the base station, a range of a second RI;
   measuring, by the terminal in the range of the second RI, the second channel according to the second measurement configuration information, to obtain second CSI, wherein the second CSI comprises the second RI;
   reporting, by the terminal to the base station, the second CSI;
   receiving, by the terminal, third measurement configuration information used for measuring a third channel;
   determining, by the terminal, a range of a third RI according to one or both of the first RI and the second RI; and
   measuring, by the terminal in the range of the third RI, the third channel according to the third measurement configuration information, to obtain third CSI,
   wherein the third CSI comprises the third RI,
   wherein the range of the third RI comprises:
   the third RI≤the first RI, or the third RI<the first RI; or
   a value obtained by rounding a quotient of the first RI and the second RI≤the third RI≤the first RI, or a value obtained by rounding a quotient of the first RI and the second RI<the third RI≤the first RI, or a value obtained by rounding a quotient of the first RI and the second RI≤the third RI<the first RI, or a value obtained by rounding a quotient of the first RI and the second RI<the third RI<the first RI, wherein the rounding is rounding up or rounding down; or
   a value obtained by rounding a quotient of the first RI and the configured RI in the second channel information≤the third RI≤the first RI, or a value obtained by rounding a quotient of the first RI and the configured RI in the second channel information<the third RI≤the first RI, or a value obtained by rounding a quotient of the first RI and the configured RI in the second channel information≤the third RI<the first RI, or a value obtained by rounding a quotient of the first RI and the configured RI in the second channel information<the third RI<the first RI, wherein the rounding is rounding up or rounding down; or
   the third RI≤a value obtained by rounding a quotient of the first RI and the second RI, or the third RI<a value obtained by rounding a quotient of the first RI and the second RI, wherein the rounding is rounding up or rounding down; or
   the third RI≤a value obtained by rounding a quotient of the first RI and the configured RI in the second channel information, or the third RI<a value obtained by rounding a quotient of the first RI and the configured RI in the second channel information, wherein the rounding is rounding up or rounding down; or
   the third RI=a value obtained by rounding a quotient of the first RI and the second RI, wherein the rounding is rounding up or rounding down; or
   the third RI=a value obtained by rounding a quotient of the first RI and the configured RI in the second channel information, wherein the rounding is rounding up or rounding down.

2. The method according to claim 1, wherein the first channel corresponds to a whole antenna, and the first CSI reflects a channel state of the whole antenna; and
   the second channel corresponds to a partial antenna, and the second CSI reflecting a channel state of the partial antenna.

3. The method according to claim 1, further comprising:
   reporting, by the terminal, a CSI measurement flag indicating whether to use a restrictive CSI measurement range.

4. The method according to claim 1, wherein the range of the second RI is less than or equal to the first RI.

5. The method according to claim 1, wherein the reported first CSI comprises the first RI and a first precoding matrix indicator (PMI).

6. A device, comprising:
   a processor and a non-transitory computer readable storage medium, wherein the non-transitory computer readable storage medium comprises a program stored therein, and when the program is executed, causes the processor to:
   receive, from a base station, first measurement configuration information used for measuring a first channel;
   measure the first channel according to the first measurement configuration information, to obtain first channel state information (CSI), wherein the first CSI comprises a first rank indication (RI);
   report, to the base station, the first CSI;
   receive, from the base station, second measurement configuration information used for measuring a second channel;
   determine, according to the first RI that is obtained by measuring and reported to the base station, a range of a second RI;
   measure, in the range of the second RI, the second channel according to the second measurement configuration information, to obtain second CSI, wherein the second CSI comprises the second RI;
   report, to the base station, the second CSI;
   receive third measurement configuration information used for measuring a third channel;
   determine a range of a third RI according to one or both of the first RI and the second RI; and
   measure, in the range of the third RI, the third channel according to the third measurement configuration information, to obtain third CSI,
   wherein the third CSI comprises the third RI, wherein the range of the third RI comprises:
the third RI≤the first RI, or the third RI<the first RI; or
a value obtained by rounding a quotient of the first RI and the second RI≤the third RI≤the first RI, or a value obtained by rounding a quotient of the first RI and the second RI<the third RI≤the first RI, or a value obtained by rounding a quotient of the first RI and the second RI≤the third RI<the first RI, or a value obtained by rounding a quotient of the first RI and the second RI<the third RI<the first RI, wherein the rounding is rounding up or rounding down; or
a value obtained by rounding a quotient of the first RI and the configured RI in the second channel information≤the third RI≤the first RI, or a value obtained by rounding a quotient of the first RI and the configured RI in the second channel information<the third RI≤the first RI, or a value obtained by rounding a quotient of the first RI and the configured RI in the second channel information≤the third RI<the first RI, or a value obtained by rounding a quotient of the first RI and the configured RI in the second channel information<the third RI<the first RI, wherein the rounding is rounding up or rounding down; or
the third RI≤a value obtained by rounding a quotient of the first RI and the second RI, or the third RI<a value obtained by rounding a quotient of the first RI and the second RI, wherein the rounding is rounding up or rounding down; or
the third RI≤a value obtained by rounding a quotient of the first RI and the configured RI in the second channel information, or the third RI<a value obtained by rounding a quotient of the first RI and the configured RI in the second channel information, wherein the rounding is rounding up or rounding down; or
the third RI=a value obtained by rounding a quotient of the first RI and the second RI, wherein the rounding is rounding up or rounding down; or
the third RI=a value obtained by rounding a quotient of the first RI and the configured RI in the second channel information, wherein the rounding is rounding up or rounding down.

7. The device according to claim 6, wherein the first channel corresponds to a whole antenna, and the first CSI reflects a channel state of the whole antenna; and
the second channel corresponds to a partial antenna, and the second CSI reflecting a channel state of the partial antenna.

8. The device according to claim 6, wherein when the program is executed, causes the processor to further:
report a CSI measurement flag indicating whether to use a restrictive CSI measurement range.

9. The device according to claim 6, wherein the range of the second RI is less than or equal to the first RI.

10. The device according to claim 6, wherein the reported first CSI comprises the first RI and a first precoding matrix indicator (PMI).

11. A base station, comprising:
a processor and a non-transitory computer readable storage medium, wherein the non-transitory computer readable storage medium comprises a program stored therein, and when the program is executed, causes the processor to:
send, to a terminal device, first measurement configuration information used for measuring a first channel;
send, to the terminal device, second measurement configuration information used for measuring a second channel;
receive first channel state information (CSI) that is obtained by the terminal device by measuring the first channel according to the first measurement configuration information and that is reported to the base station, wherein the first CSI comprises a first rank indication (RI);
receive second CSI that is obtained by the terminal device by measuring, in a range of a second RI, the second channel according to the second measurement configuration information and that is reported to the base station, wherein the second CSI comprises the second RI, and the range of the second RI is determined according to the first RI;
send third measurement configuration information used for measuring a third channel; and
receive third CSI that is obtained by the terminal device by measuring, in a range of a third RI, the third channel according to the third measurement configuration information and that is reported by the terminal device, wherein the third CSI comprises the third RI, wherein the range of the third RI comprises:
the third RI≤the first RI, or the third RI<the first RI; or
a value obtained by rounding a quotient of the first RI and the second RI≤the third RI≤the first RI, or a value obtained by rounding a quotient of the first RI and the second RI<the third RI≤the first RI, or a value obtained by rounding a quotient of the first RI and the second RI≤the third RI<the first RI, or a value obtained by rounding a quotient of the first RI and the second RI<the third RI<the first RI, wherein the rounding is rounding up or rounding down; or
a value obtained by rounding a quotient of the first RI and the configured RI in the second channel information≤the third RI≤the first RI, or a value obtained by rounding a quotient of the first RI and the configured RI in the second channel information<the third RI≤the first RI, or a value obtained by rounding a quotient of the first RI and the configured RI in the second channel information≤the third RI<the first RI, or a value obtained by rounding a quotient of the first RI and the configured RI in the second channel information<the third RI<the first RI, wherein the rounding is rounding up or rounding down; or
the third RI≤a value obtained by rounding a quotient of the first RI and the second RI, or the third RI<a value obtained by rounding a quotient of the first RI and the second RI, wherein the rounding is rounding up or rounding down; or
the third RI≤a value obtained by rounding a quotient of the first RI and the configured RI in the second channel information, or the third RI<a value obtained by rounding a quotient of the first RI and the configured RI in the second channel information, wherein the rounding is rounding up or rounding down; or
the third RI=a value obtained by rounding a quotient of the first RI and the second RI, wherein the rounding is rounding up or rounding down; or
the third RI=a value obtained by rounding a quotient of the first RI and the configured RI in the second channel information, wherein the rounding is rounding up or rounding down.

12. The base station according to claim 11, wherein the first channel corresponds to a whole antenna, and the first CSI reflects a channel state of the whole antenna; and the second channel corresponds to a partial antenna, and the second CSI reflecting a channel state of the partial antenna.

13. The device according to claim 11, wherein when the program is executed, causes the processor to further:

receive a CSI measurement flag indicating whether to use a restrictive CSI measurement range.

14. A channel measurement method, comprising:

receiving, by a terminal from a base station, first measurement configuration information used for measuring a first channel;

measuring, by the terminal, the first channel according to the first measurement configuration information, to obtain first channel state information (CSI), wherein the first CSI comprises a first rank indication (RI);

reporting, by the terminal to the base station, the first CSI, wherein the reported first CSI comprises the first RI and a first precoding matrix indicator (PMI);

receiving, by the terminal from the base station, second measurement configuration information used for measuring a second channel;

determining, according to the first RI that is obtained by measuring and reported to the base station, a range of a second RI;

measuring, by the terminal in the range of the second RI, the second channel according to the second measurement configuration information, to obtain second CSI, wherein the second CSI comprises the second RI;

reporting, by the terminal to the base station, the second CSI; and determining the first PMI according to the first measurement configuration information and the first RI, wherein a port quantity of a precoding matrix corresponding to the first PMI is a port quantity of a pilot in the first measurement configuration information, and an RI of the precoding matrix corresponding to the first PMI is the first RI.

15. A device, comprising:

a processor and a non-transitory computer readable storage medium, wherein the non-transitory computer readable storage medium comprises a program stored therein, and when the program is executed, causes the processor to:

receive, from a base station, first measurement configuration information used for measuring a first channel;

measure the first channel according to the first measurement configuration information, to obtain first channel state information (CSI), wherein the first CSI comprises a first rank indication (RI);

report, to the base station, the first CSI, wherein the reported first CSI comprises the first RI and a first precoding matrix indicator (PMI);

receive, from the base station, second measurement configuration information used for measuring a second channel;

determine, according to the first RI that is obtained by measuring and reported to the base station, a range of a second RI;

measure, in the range of the second RI, the second channel according to the second measurement configuration information, to obtain second CSI, wherein the second CSI comprises the second RI;

report, to the base station, the second CSI; and determine the first PMI according to the first measurement configuration information and the first RI, wherein a port quantity of a precoding matrix corresponding to the first PMI is a port quantity of a pilot in the first measurement configuration information, and an RI of the precoding matrix corresponding to the first PMI is the first RI.

\* \* \* \* \*